(12) United States Patent
Law et al.

(10) Patent No.: US 12,269,146 B2
(45) Date of Patent: *Apr. 8, 2025

(54) MOBILE AND MODULAR DRILL APPARATUS, COMPONENTS THEREOF, AND METHODS OF USE

(71) Applicant: Swinerton Incorporated, San Francisco, CA (US)

(72) Inventors: Eric Law, San Francisco, CA (US); Tristen Magallanes, San Francisco, CA (US); Alex Wuebben, San Francisco, CA (US)

(73) Assignee: Swinerton Incorporated, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/222,925

(22) Filed: Jul. 17, 2023

(65) Prior Publication Data
US 2023/0356372 A1   Nov. 9, 2023

Related U.S. Application Data

(63) Continuation of application No. 17/462,343, filed on Aug. 31, 2021, now Pat. No. 11,701,761.
(Continued)

(51) Int. Cl.
*B25B 23/12* (2006.01)
*B25B 21/00* (2006.01)
(Continued)

(52) U.S. Cl.
CPC ............ *B25B 23/12* (2013.01); *B25B 21/002* (2013.01); *B25B 23/005* (2013.01); *B25B 23/04* (2013.01); *B62B 3/00* (2013.01); *B62B 2202/48* (2013.01)

(58) Field of Classification Search
CPC ......... B23P 19/00; B23P 19/002; B23P 19/06; B23P 19/10; B25C 1/182; B25B 23/12;
(Continued)

(56) References Cited

U.S. PATENT DOCUMENTS

| 2,761,559 | A | * | 9/1956 | Burge | ...................... H02B 3/00 29/710 |
| 2,997,202 | A | * | 8/1961 | Madeux | .................. B25B 23/04 81/433 |

(Continued)

FOREIGN PATENT DOCUMENTS

| DE | 102011013878 A1 | 9/2012 |
| DE | 102011013878 B4 | 7/2014 |

(Continued)

*Primary Examiner* — David B. Thomas
(74) *Attorney, Agent, or Firm* — Akerman LLP; Peter A. Chiabotti

(57) ABSTRACT

An apparatus providing a platform for installing screws can include a cart with wheels, an assembly rail system mounted to the cart, and a screw assembly mounted to the assembly rail system. The screw assembly can include a screw feeding device, a screw guide tube, and a screwing device such as a drill that rotates a drive shaft that engages a screw received from the screw guide tube. The screw feeding device can include a screw rack that holds screws, and a magnetic grip that moves a screw from the screw rack to a screw feeding tube that is connected to the screw guide tube. The screw guide tube can include bristles for centering a screw received from the screw feeding tube. The apparatus can include a computer control system that operates the screwing device and the screw feeding device.

20 Claims, 36 Drawing Sheets

Related U.S. Application Data

(60) Provisional application No. 63/072,911, filed on Aug. 31, 2020.

(51) Int. Cl.
  *B25B 23/00* (2006.01)
  *B25B 23/04* (2006.01)
  *B62B 3/00* (2006.01)

(58) Field of Classification Search
  CPC ....... B25B 23/005; B25B 23/04; E04D 15/04; E04D 2015/047
  See application file for complete search history.

(56) References Cited

U.S. PATENT DOCUMENTS

| | | | |
|---|---|---|---|
| 3,029,978 A * | 4/1962 | Gummere | B25B 23/02 |
| | | | 221/113 |
| 3,199,722 A * | 8/1965 | Madeux | B25B 23/04 |
| | | | 81/433 |
| 4,246,939 A | 1/1981 | Boegel | |
| 5,015,127 A * | 5/1991 | Hockman | B23P 19/003 |
| | | | 81/430 |
| 5,904,079 A | 5/1999 | Tsuge et al. | |
| 5,975,350 A | 11/1999 | Han | |
| 6,138,535 A | 10/2000 | Jalbert et al. | |
| 6,170,366 B1 | 1/2001 | Jalbert et al. | |
| 6,186,035 B1 | 2/2001 | Jalbert et al. | |
| 6,230,594 B1 | 5/2001 | Jalbert et al. | |
| 6,412,603 B1 | 7/2002 | Nervig et al. | |
| 6,866,443 B2 | 3/2005 | Nanaumi et al. | |
| 6,929,250 B2 | 8/2005 | Blake et al. | |
| 6,945,140 B2 | 9/2005 | Gibbons et al. | |
| 7,059,616 B2 | 6/2006 | Wu | |
| 7,134,367 B2 | 11/2006 | Gehring et al. | |
| 7,415,910 B2 | 8/2008 | Arai | |
| 7,493,839 B2 | 2/2009 | Massari, Jr. et al. | |
| 7,857,328 B1 | 12/2010 | Boss | |
| 7,896,083 B2 | 3/2011 | Vickery | |
| 7,962,996 B1 | 6/2011 | Mondello | |
| 8,016,300 B2 | 9/2011 | Cramer et al. | |
| 8,074,348 B2 | 12/2011 | Haytayan | |
| 8,282,111 B2 | 10/2012 | Hailston et al. | |
| 8,726,848 B2 | 5/2014 | Melhorn et al. | |
| 8,894,076 B2 | 11/2014 | Hailston et al. | |
| 8,931,787 B2 | 1/2015 | Crawford et al. | |
| 9,067,285 B2 * | 6/2015 | Ota | B25B 23/04 |
| 9,278,040 B2 | 3/2016 | Hung | |
| 9,283,975 B2 | 3/2016 | McClanahan et al. | |
| 9,352,435 B2 | 5/2016 | Spishak et al. | |
| 9,573,639 B1 | 2/2017 | Furtado | |
| 9,630,640 B1 | 4/2017 | Collins et al. | |
| 9,682,465 B2 | 6/2017 | Lan et al. | |
| 9,751,549 B2 | 9/2017 | McClanahan et al. | |
| 9,758,184 B1 | 9/2017 | Vaverek | |
| 9,802,300 B2 | 10/2017 | Vandenberg | |
| 10,040,674 B2 | 8/2018 | Xu et al. | |
| 10,118,632 B2 | 11/2018 | Carzola | |
| 10,315,295 B2 | 6/2019 | Vandenberg | |
| 10,543,983 B2 | 1/2020 | Otto et al. | |
| 10,569,397 B2 | 2/2020 | Arai et al. | |
| 2003/0047895 A1 | 3/2003 | McElroy | |
| 2004/0139822 A1 | 7/2004 | Gehring et al. | |
| 2005/0039580 A1 | 2/2005 | Gibbons et al. | |
| 2006/0038383 A1 | 2/2006 | Wu | |
| 2006/0053978 A1 | 3/2006 | Arai | |
| 2006/0169415 A1 | 8/2006 | Lawson et al. | |
| 2006/0191385 A1 | 8/2006 | Massari et al. | |
| 2006/0220334 A1 | 10/2006 | Liao | |
| 2007/0187915 A1 | 8/2007 | Filiatrault | |
| 2007/0199277 A1 | 8/2007 | Martin | |
| 2007/0271761 A1 | 11/2007 | Haytayan | |
| 2012/0210831 A1 | 8/2012 | Liang | |
| 2012/0319063 A1 | 12/2012 | Hailston et al. | |
| 2014/0007742 A1 | 1/2014 | Tochibori | |
| 2014/0117638 A1 | 5/2014 | Crawford et al. | |
| 2014/0218282 A1 | 8/2014 | Hung | |
| 2015/0050107 A1 | 2/2015 | Kipp | |
| 2015/0166314 A1 | 6/2015 | Xu et al. | |
| 2015/0321325 A1 | 11/2015 | Vandenberg | |
| 2016/0136663 A1 | 5/2016 | Smith | |
| 2017/0101119 A1 | 4/2017 | Collins et al. | |
| 2017/0312896 A1 | 11/2017 | Arai et al. | |
| 2017/0334644 A1 | 11/2017 | Otto | |
| 2017/0341666 A1 | 11/2017 | Carzola | |
| 2018/0117754 A1 | 5/2018 | Corn | |
| 2018/0243889 A1 | 8/2018 | Myers | |
| 2019/0023298 A1 | 1/2019 | Carzola | |
| 2023/0025226 A1 * | 1/2023 | Aizawa | B25C 1/06 |

FOREIGN PATENT DOCUMENTS

| | | |
|---|---|---|
| IT | 1203488 B | 2/1989 |
| WO | 02057434 A2 | 7/2002 |

\* cited by examiner

```
         STEP 3              EMERGENCY STOP       MAIN CYLINDER DOWN
         ⒷC3                    ⒷX103                  ⒷY206
35 ──────┤├──────────────────────┤├──────────────────────(OUT)
         STEP 3              EMERGENCY STOP       MAIN CYLINDER UP
         ⒷC3                    ⒷX103                  ⒷY215
36 ──────┤├──────────────────────┤├──────────────────────(OUT)

37 ──────────────────────────────────────────────────────(NOP)

38 ──────────────────────────────────────────────────────(NOP)

39 ──────────────────────────────────────────────────────(NOP)

40 ──────────────────────────────────────────────────────(NOP)

41 ──────────────────────────────────────────────────────(NOP)

42 ─────────────────────────────────────(END)
```

FIG. 25D

MOBILE AND MODULAR DRILL APPARATUS, COMPONENTS THEREOF, AND METHODS OF USE

CROSS REFERENCE TO RELATED APPLICATION

This non-provisional patent application is a continuation of U.S. application Ser. No. 17/462,343 filed Aug. 31, 2021, which claims the benefit of U.S. Provisional Patent Application No. 63/072,911, filed Aug. 31, 2020, both of which are herein incorporated by reference.

FIELD OF THE APPLICATION

The present application relates to drills and platforms for drills, and more particularly, to mobile drill platforms.

BACKGROUND

Construction requires a variety of tools and fasteners to create stable structures. Traditional and general tools have been used for a variety of tasks. Although such tools, such a hammer and nail, are sufficient, room for significant improvement exists. Specialized tools can greatly increase the efficiency and productivity of certain jobs.

SUMMARY

A mobile platform and related devices, apparatuses and assemblies are disclosed for rapidly screwing fasteners, such as screws, into wood and other materials. The mobile platform can include a cart with wheels, a drill, screw guide tube, and screw feeding device that allows the operator to quickly and efficiently insert the screws into the desired location in workpiece or work surface. The cart can include an upright structure configured to be the height of an average operator.

In operation, the user can walk behind the cart in a comfortable upright position without the need to bend down or get on the user's knees. In the upright position, the operate all functions of the platform via the control computer system, including feeding and drilling the screws. The operator can use the powered wheels to advance the mobile platform to the next desired location and repeat the process.

The mobile platform provides for labor productivity gains while greatly reducing the chance of injury, particular when fastening wood or mass timber decks. The operator of such a platform can operate the platform herein while standing upright. Without the need to constantly bend down or sit down, productivity increases can range from 75% to 90%. By operating the devices herein in a standing position, the risk of injury is decreased. Still further, the mobile platform provides for uniform construction resulting in stronger builds and that a ensured to be compliant with established standards. Further, the flexibility of the system between the lateral distance of screw insertion points and the distance from one insertion to the next allows the platform to be meet standards as they evolve.

In one embodiment, an apparatus can include a cart with wheels, an assembly rail system mounted to the cart, a screw assembly mounted to the assembly rail system. The screw assembly system can include a drill that rotates a drive shaft that engages a screw, a screw guide tube, a screw feeding tube connected to the screw feeding tube, and a screw feeding device. The screw feeding device can include a screw rack and a magnetic grip that moves a screw from the screw rack to the screw feeding tube. Also, the screw assembly can also include a plurality of limit stops, where a limit stop of plurality of limit stops disengages the drill, the pneumatic drive, or both the drill and pneumatic drive. The apparatus can further include a pneumatic drive and the wheels can be motorized.

Still further, a computer control system can be provided that controls the operations of the drill, the screw feeding device, the pneumatic drive, the wheels or a combination thereof. The control by the computer control system limits user interaction with the hardware that provides for a safe operation and limits operator error.

In another embodiment, a screw feeding device is provided. The screw feeding device can include a screw rack, a solenoid to release a single screw from the screw rack, a screw guide bracket, an air piston to advance the screw through the screw guide bracket and a magnetic grip that moves a screw from the screw rack to the screw feeding tube. The screw feeding device can also include a motor and a rotatable rod coupled to the motor, where the magnetic grip is mounted on the rotatable rod. Further, in operation, actuating the motor rotates the rotatable rod until the screw is dropped into a screw feeding tube.

In another embodiment, a modular drill platform can include a cart for facilitating movement of the modular platform in a plurality of directions, a compressor to facilitate operation of a drill of the modular drill platform, a memory that stores instructions and a processor that executes the instructions to perform operations. The operations can include receiving an input, processing the input and causing the modular platform, the cart, or both, to perform an action in response to the input, where the action can include activating the compressor of the modular drill platform, moving the cart, drilling into a work surface, or a combination thereof.

In other embodiments, a method of controlling a modular drill platform is provided. The method can include receiving an input, processing the input, and causing the modular drill platform to perform an action in response to the input. The actions can include activating a compressor of the modular drill platform, moving a cart of the modular drill platform, drilling into a work surface, or a combination thereof. Further, the action can include feeding a screw to be drilled. Additionally, the action can include drilling the screw into the workpiece.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 25A-D is logic diagram of utilized by a control computer system.

DETAILED DESCRIPTION OF THE DRAWINGS

Embodiments of the present disclosure are best understood by referring to the figures of the drawings, like terminology being used for like and corresponding parts of the various drawings.

Figure 1:
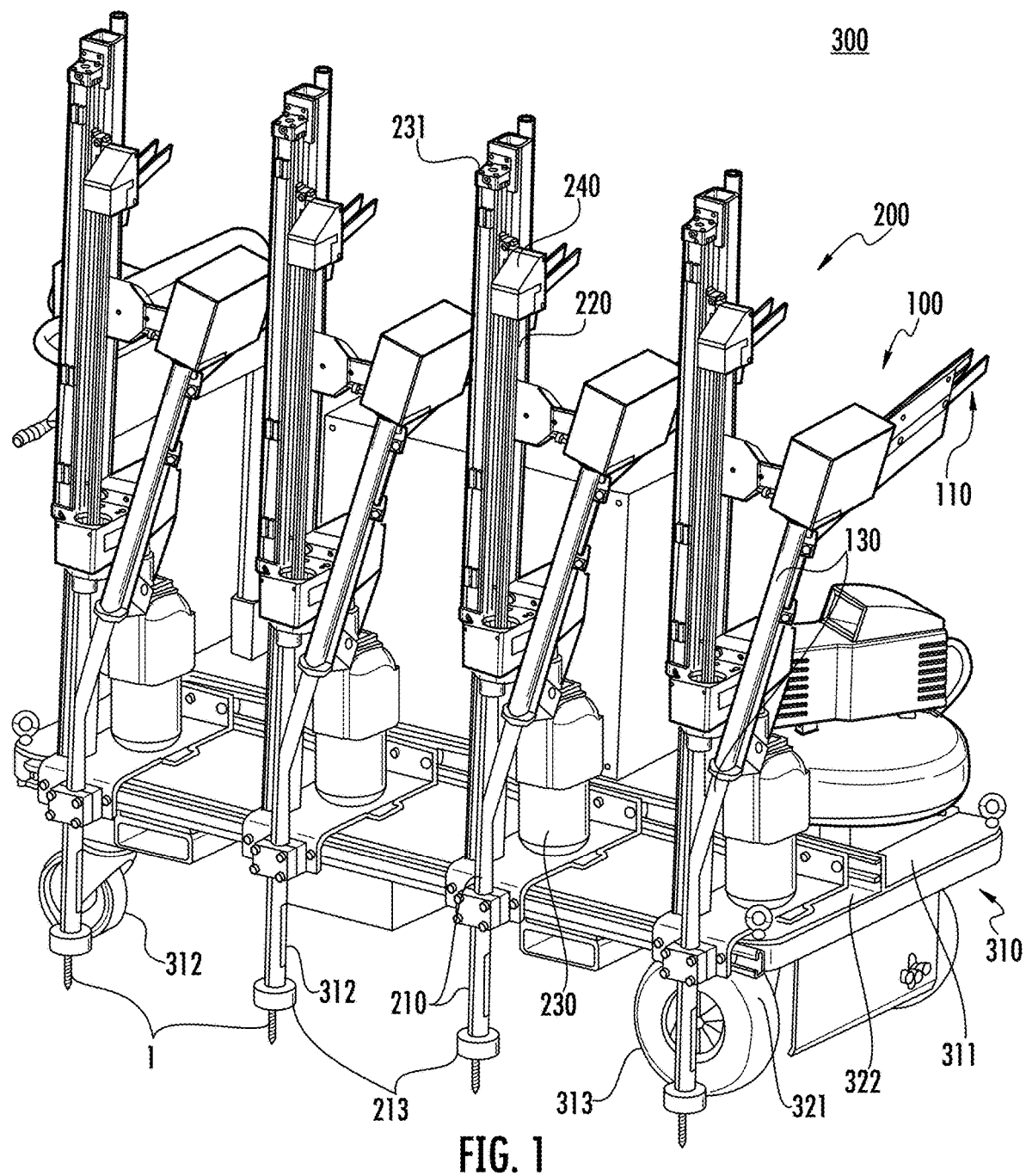
FIG. 1 is a perspective view of an apparatus according to an embodiment of the present disclosure.

FIGS. 1-26 illustrate components exemplifying an apparatus that provides a mobile and modular platform for inserting fasteners 1, such as screws 1, in a desired location of a workpiece 2 such as wood flooring 2. As one example, the apparatus 300 can be used by a single operator to insert large screws 1 into the flooring 2 of a wood deck, such as a mass timber deck made of laminated or otherwise processed wood 2. The apparatus 300 can be operated at the operator's normal standing height without the need to bend over or get on the operator's knees. As shown in FIG. 1, the mobile apparatus 300 can simultaneously insert multiple screws 1 using several screw assemblies 200 that receive screws 1 from automated screw feeding devices 100.

Figure 2:
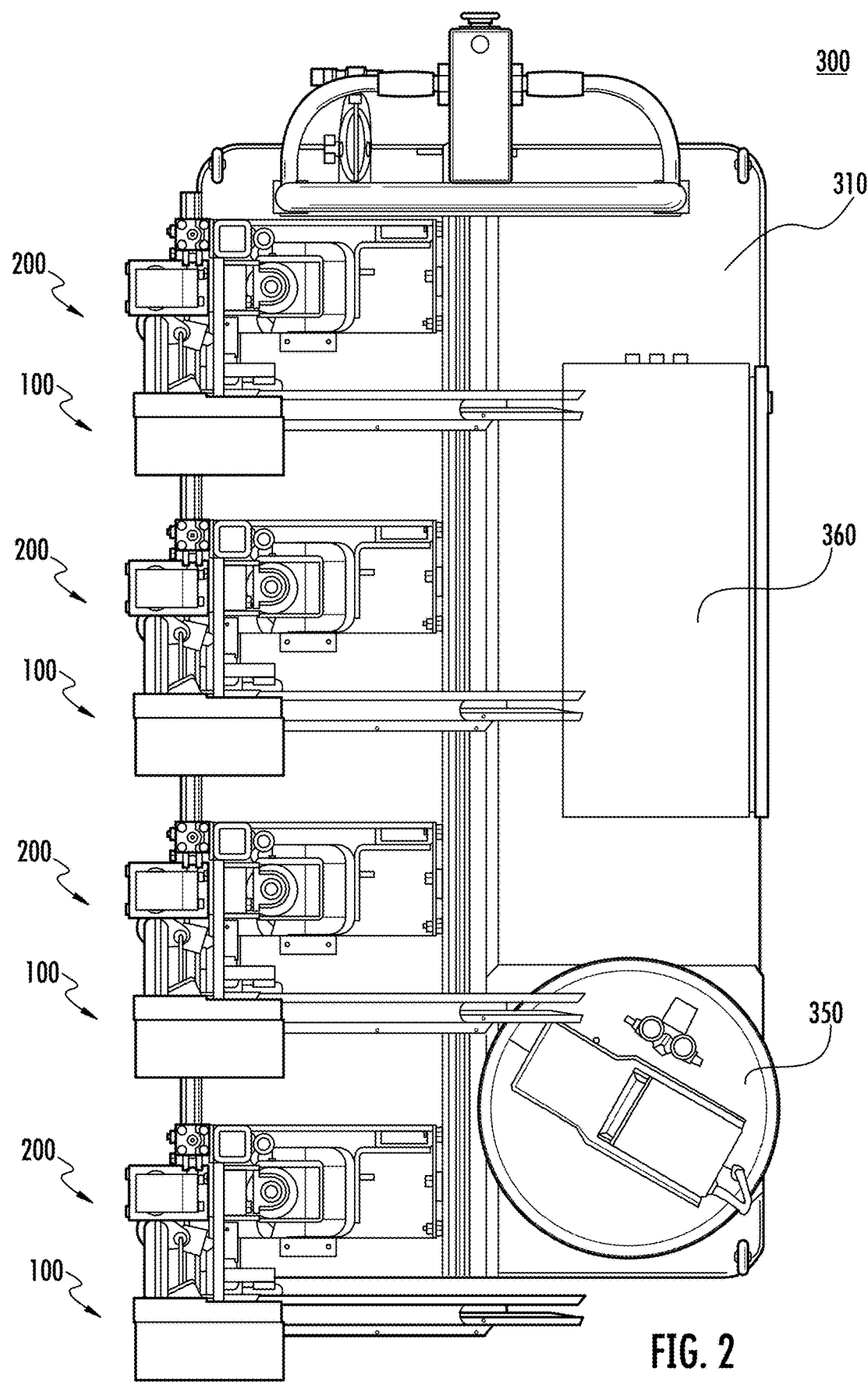
FIG. 2 is a top view of the apparatus of FIG. 1.

In some embodiments, the mobile apparatus 300 can have a cart 310 having a cart deck 311 on which multiple components are attached. The cart 310 can include non-motorized wheels or casters 312 and/or motorized or drive wheels 313. The cart 310 can have an assembly rail system 320, which may include a first rail 321 and a second rail 322, that holds one or more screw assemblies 200. Such an apparatus 300 provides a modular platform because multiple screw assemblies 200 can be added or removed from the assembly rail system 320. Referring to FIG. 2, the cart 310 can also include a compressor 350, and a computer system or a control computing device 360.

Figure 3:
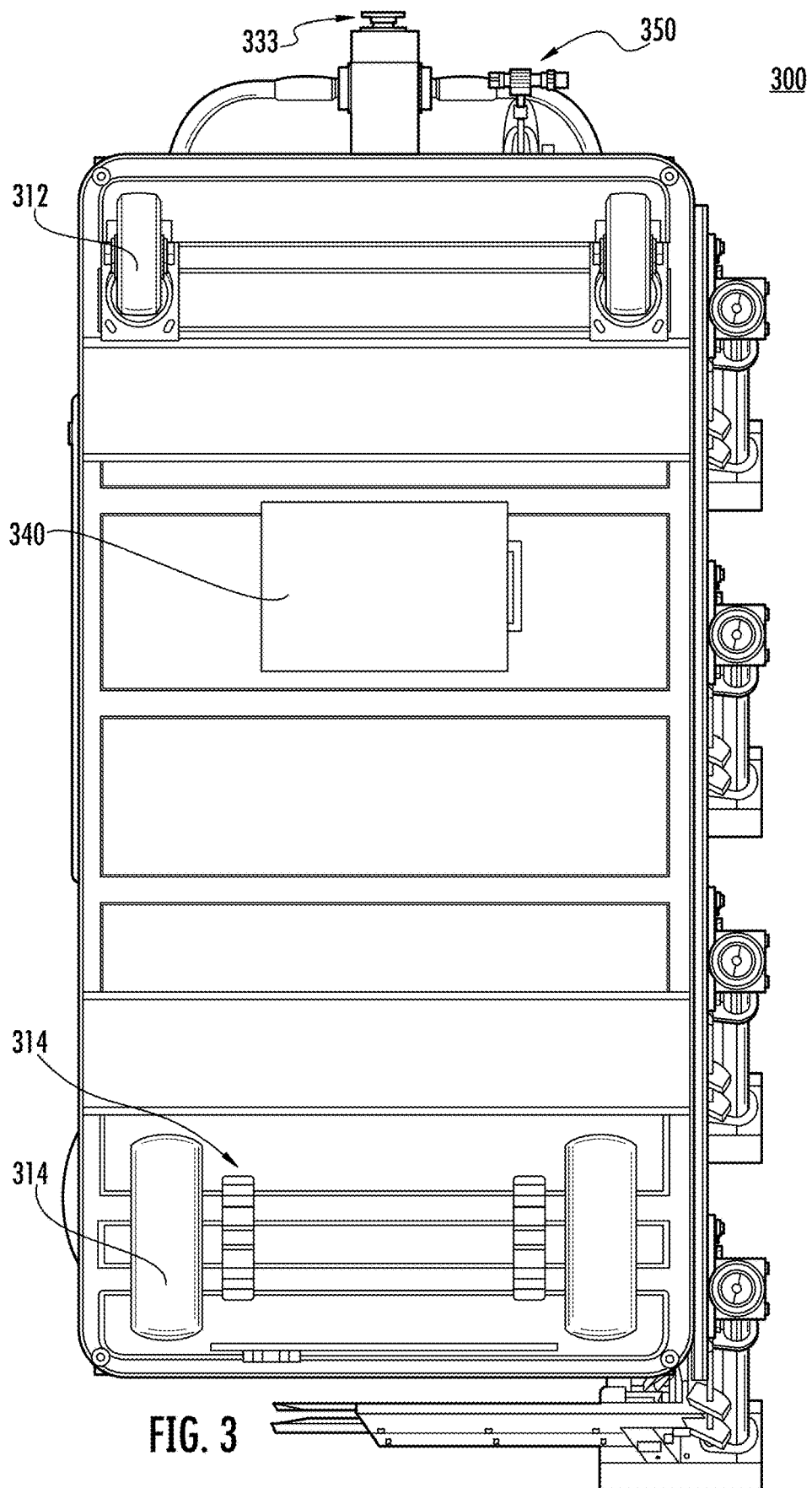
FIG. 3 is a bottom view of the apparatus of FIG. 1.
Figure 4:
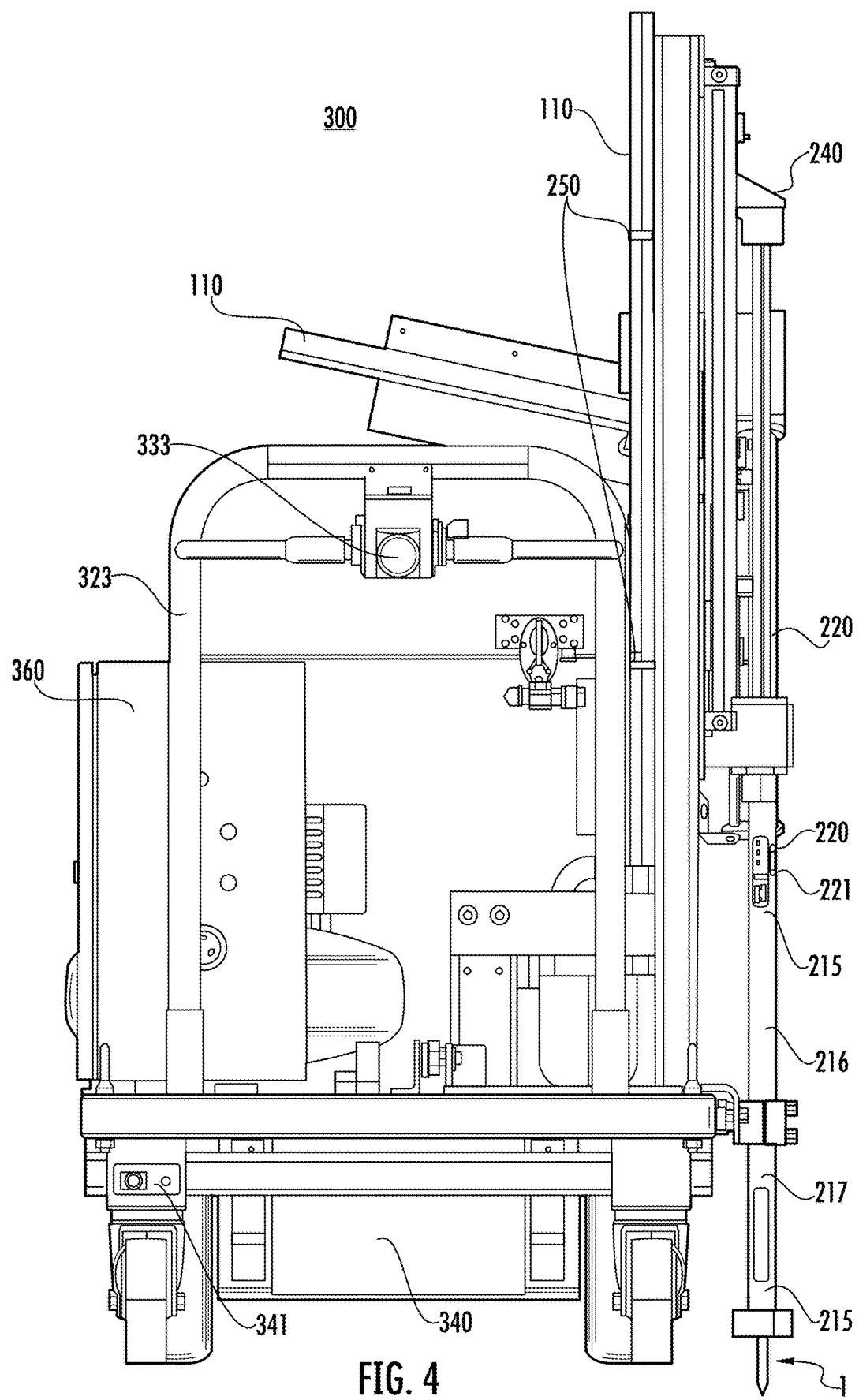
FIG. 4 is a rear view of the apparatus of FIG. 1.

As shown in FIG. 3, the cart 310 can include a battery 340 and a wheel motor 314 to power the drive wheels 313. The battery 340 can also provide power to control computing device 360 shown in FIG. 4. The cart 310 can have a charging port 341 to charge the battery 340. The cart 310 can also have an upright structure 323 configured to be the height of an average operator. The cart 310 can include operator controls 330, such an emergency stop button 333, that may located on the upright structure 323 of the cart 310.

Figure 10:
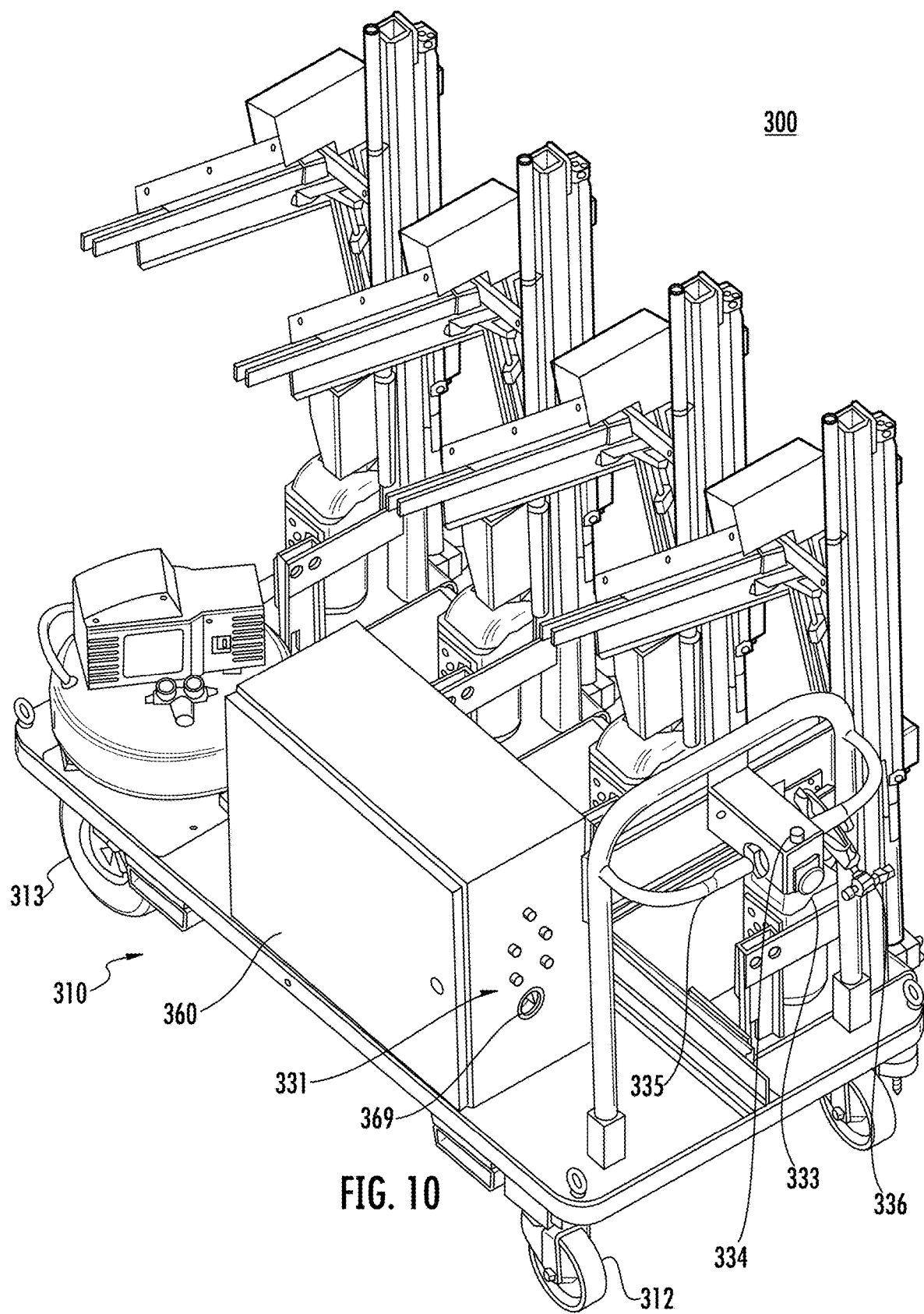
FIG. 10 is another perspective view of the apparatus of FIG. 1.
Figure 11A:
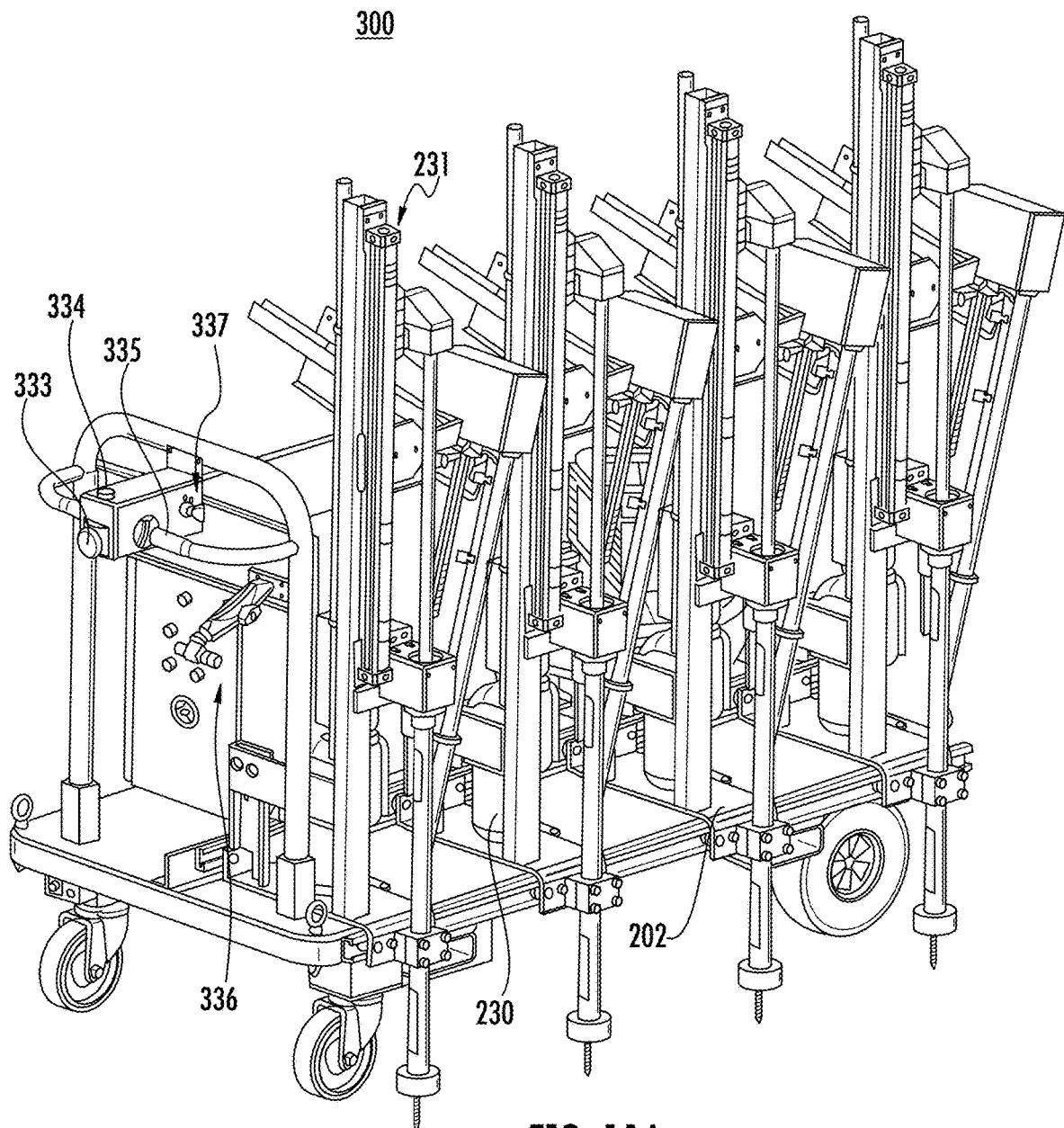
FIG. 11A is another perspective view of the apparatus of FIG. 1.

The computer system or control computing device 360 can provide power to, and control, all of the functions and devices of the apparatus 300. Additionally, the control computing device 360 can include control actuators 331 as shown in FIGS. 10-11A. The control actuators 331 can be manually depressed or turned to engage or disengage a screwing device 230, such as a drill 230, and/or a pneumatic drive 240. In operation, the operator can use the control actuators 331 to have some drills 230 and pneumatic drives 240 be engaged while others remain idle. This allows a combination of drills 230 and pneumatic drives 240 to be used, or not be used, without removing them from the apparatus 300. The computing device 360 can be plugged in via a control power port 369.

Figure 5:
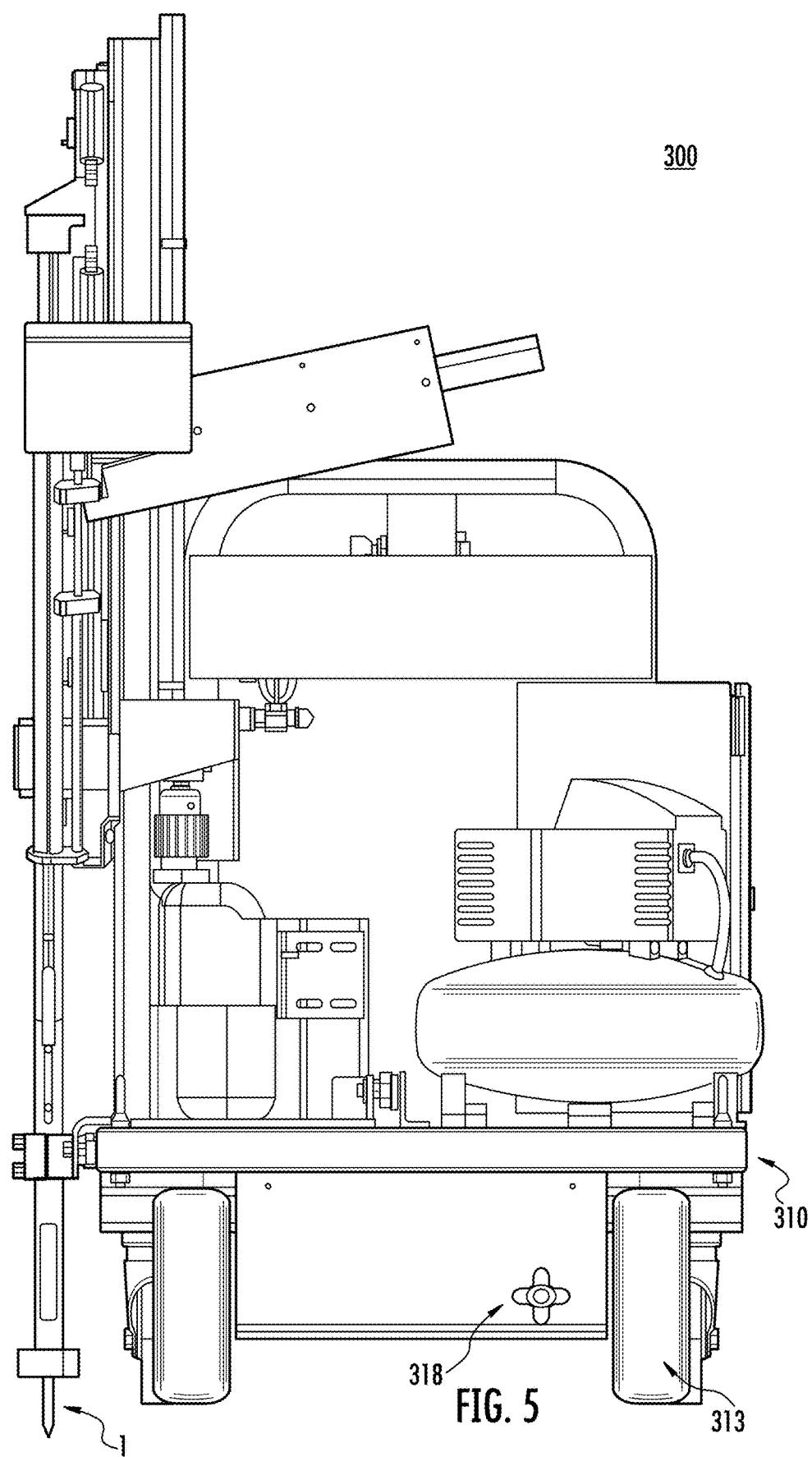
FIG. 5 is a front view of the apparatus of FIG. 1.

The cart 310 can have casters 312 that pivot, which allow the cart 310 to be rolled along any suitable surface and to change the direction 316 of the cart 310 as needed. The cart 310 can also have drive wheels 313 that contain one or more motors 314 to drive the wheels 313 and the cart 310 with all of the components of the mobile apparatus 300. Referring to FIG. 5, a control lever or foot pedal 318 located at the front of the cart 310 and opposite of the operator controls 330 can be provided to allow for the motors 314 of the drive wheels 313 to be engaged for assisted movement 315, or disengaged for manual movement 315, of the cart 310. The cart deck 311 can also be used to store materials 390 to be used with the apparatus 300, spare parts or a backup battery, or other supplies and materials 390 to be used during construction. For instance, the cart deck 311 may be used to store boxes of fasteners 1, such screws 1.

Figure 6:
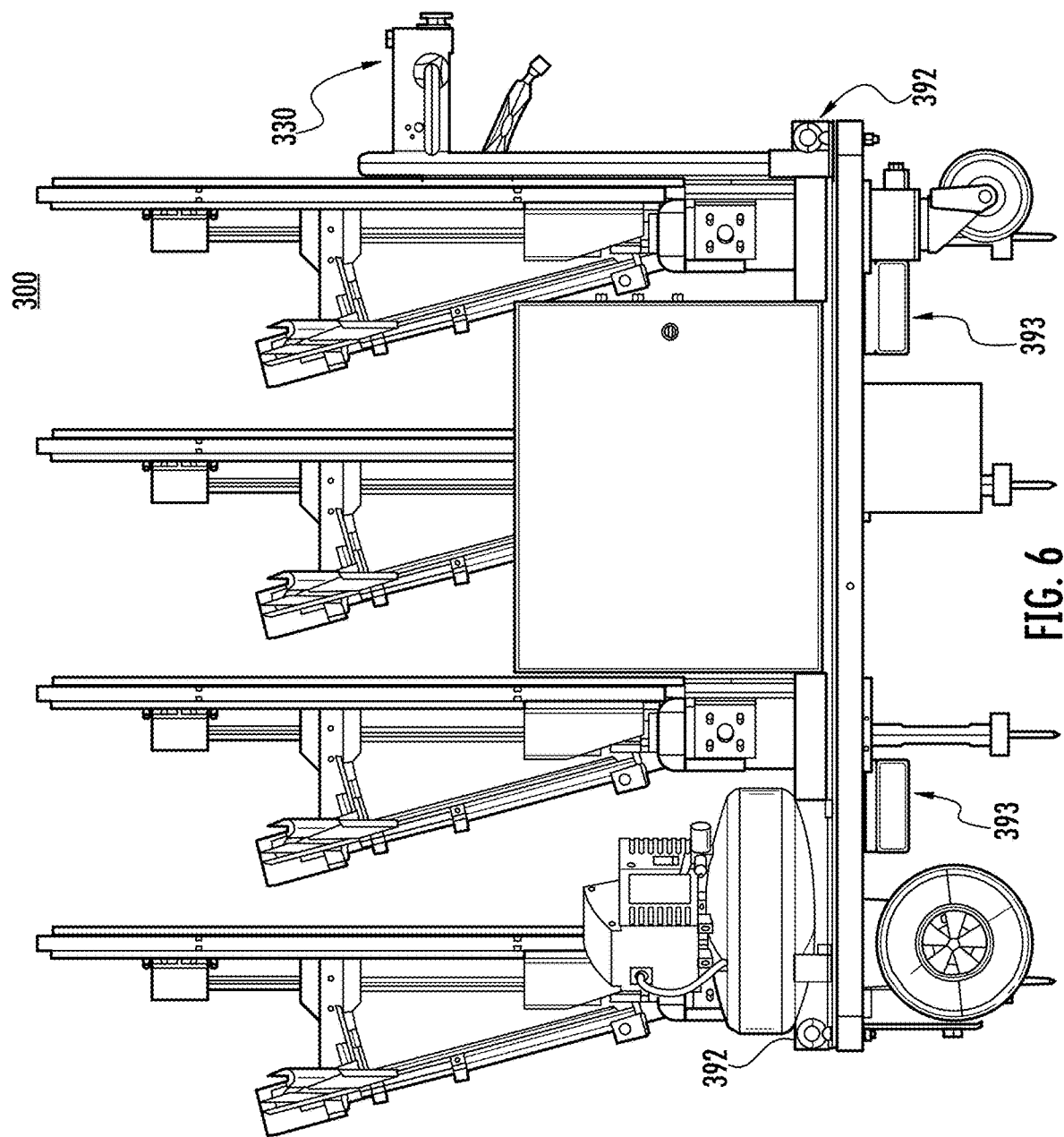
FIG. 6 is a side view of the apparatus of FIG. 1.

Referring to FIG. 6, the cart 310 can also have eye bolts or other hooks 392 for attachment to other machines, such as cranes to move the apparatus 300 and all of its components. Likewise, the cart 310 can also have fork lift pockets 393 that receive a fork lift for lifting and moving the apparatus 300 and all of its components.

Figure 8:
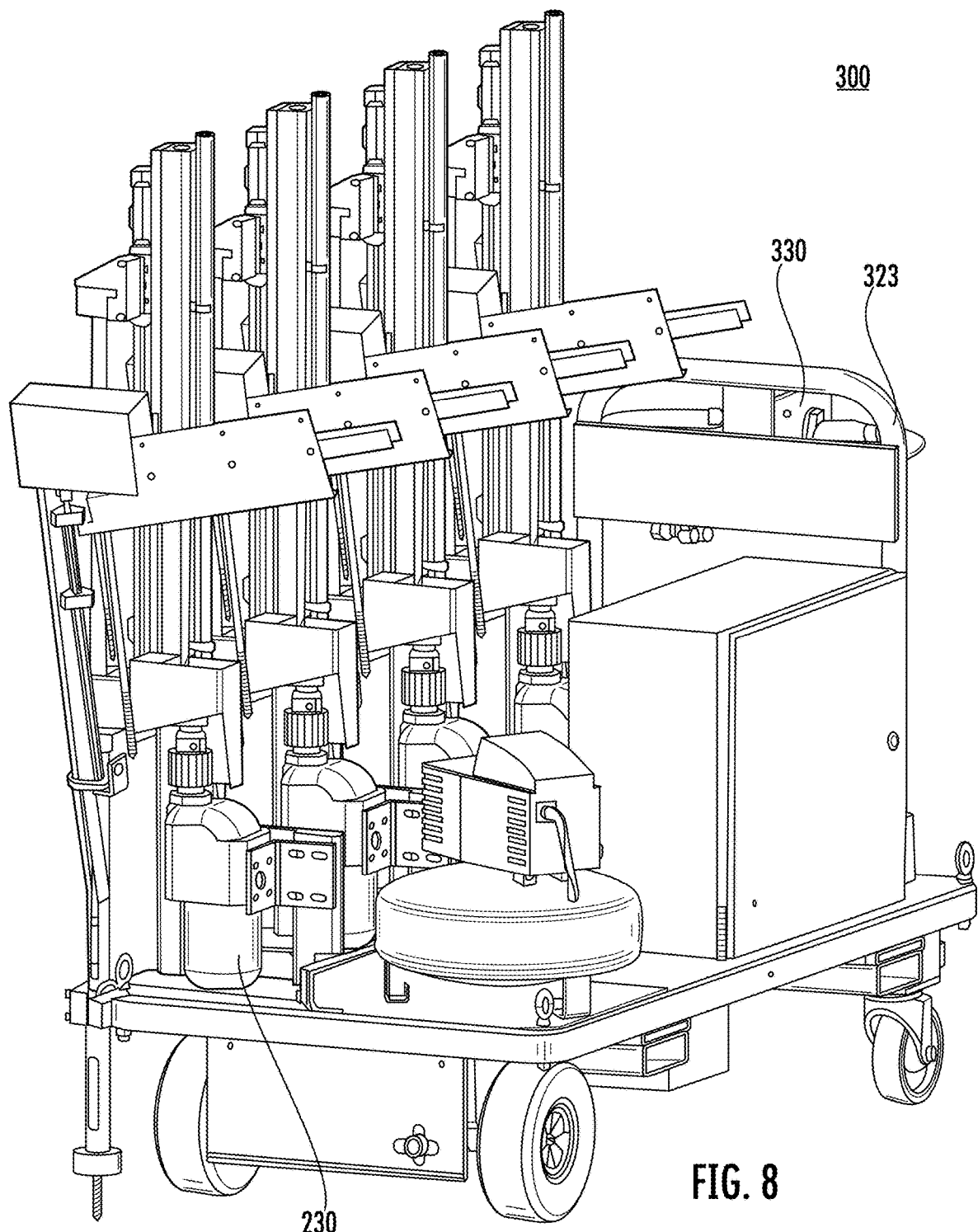
FIG. 8 is another perspective view of the apparatus of FIG. 1.
Figure 9:
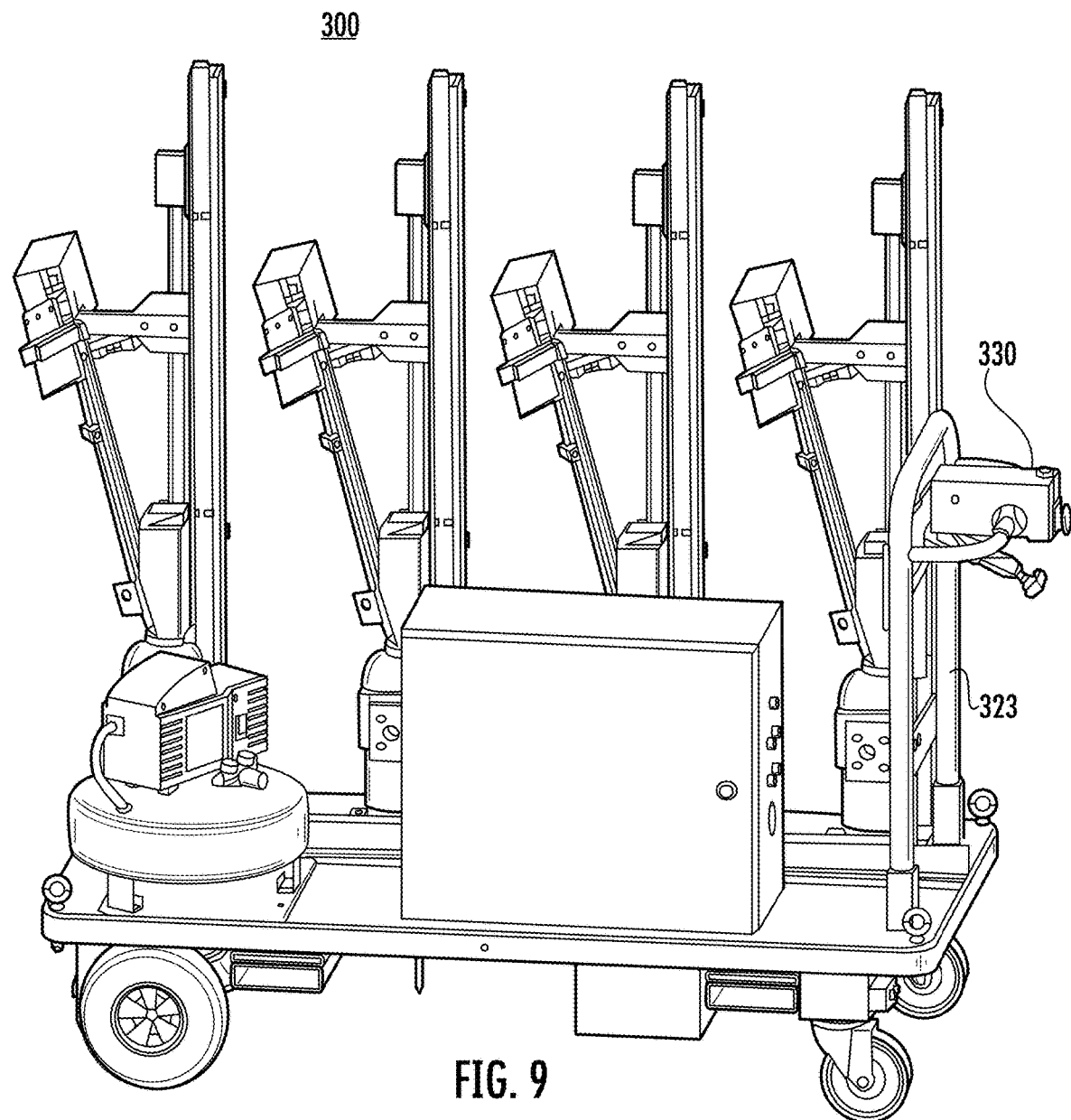
FIG. 9 is another perspective view of the apparatus of FIG. 1.

The cart 310 can also have an upright structure 323 configured to be the height of an average operator, or less than the height of an average doorway to enable the mobile apparatus 300 to be moved into various facilities without removing components. As shown in FIGS. 8-9, the operator controls 330 can be mounted to the upright structure 323 for use during operation. Referring again to FIGS. 10-11A, the operator controls 330 can include an emergency shutoff switch 333, a drill button 334, cart directional throttles 335, and an adjustable visual indicator or laser 336. The emergency shutoff switch or button 333 can cut power to all of the components of the apparatus 300. The drill button 334 can be depressed by a user to fire the operational drills 230. The directional cart throttles 335 can be engaged by the operator to change the direction 316 of movement 315 of the cart 310 to forward or backward by twisting the throttle or grip 335. The directional cart throttles 335 can be rotated in the forward direction to move the cart 310 in the forward direction. Likewise, the directional cart throttles 335 can be rotated in the rear or backward directing to move the cart 310 in the rear or backward direction 316. Two, independent directional cart throttles 335 can be provided where each directional cart throttle 335 controls the direction of a single powered wheel 313. In this arrangement, the directional cart throttles 335 can be rotated in opposite directions such that movement 315 of the cart 310 will turn the cart 310 in a desired direction. Lastly, adjustable visual indicator or laser can project a beam of light or other visual indicator in the rearward direct. The angle at which the adjustable visual indicator or laser can be adjusted to change the distance behind the apparatus 300 the visual indicator is displayed on the workpiece 2, such as mass timber structure. In operation, the operator can move the cart 310 forward until the visual indication touches the last inserted screw. At that point, the cart 310 will have moved forward a predetermined distance to insert the next screws 1, and maintain uniform distance between screws 1.

The cart 310 can also include an assembly rail system 320. The assembly rail system 320 can include a first rail 321 and second rail 322 to which the screw assembly 200 can be slidably attached and also temporarily fixed in a desired position. The first rail 321 can be located in the middle of the cart 310 to provide support at a center of gravity of the overall apparatus 300. The second rail 322 can be located on a drill edge of the cart 310. Each screw assembly 200 can slide or roll via rollers on the first and second rails 321, 322 to a desired location. Because the screw assemblies 200 are slidable along the assembly rail system 320, the distance between each screw assembly 200 can be adjusted by the operator. Further, a screw assembly 200 can be removed and additional screw assemblies 200 can be added to adjust the number of screw assemblies 200, and thus screws 1 to be drilled in to the workpiece 2. A screw assembly 200 can also be removed for servicing or maintenance. Although the screw assemblies 200 can slide on the assembly rail system 320, the screw assemblies 200 can also be locked in position relative to the assembly rail system 320. The screw assemblies 200 can be locked by bolts or other fastener to temporarily fix the screw assembly 200 to the assembly rail system 320.

Figure 11B:
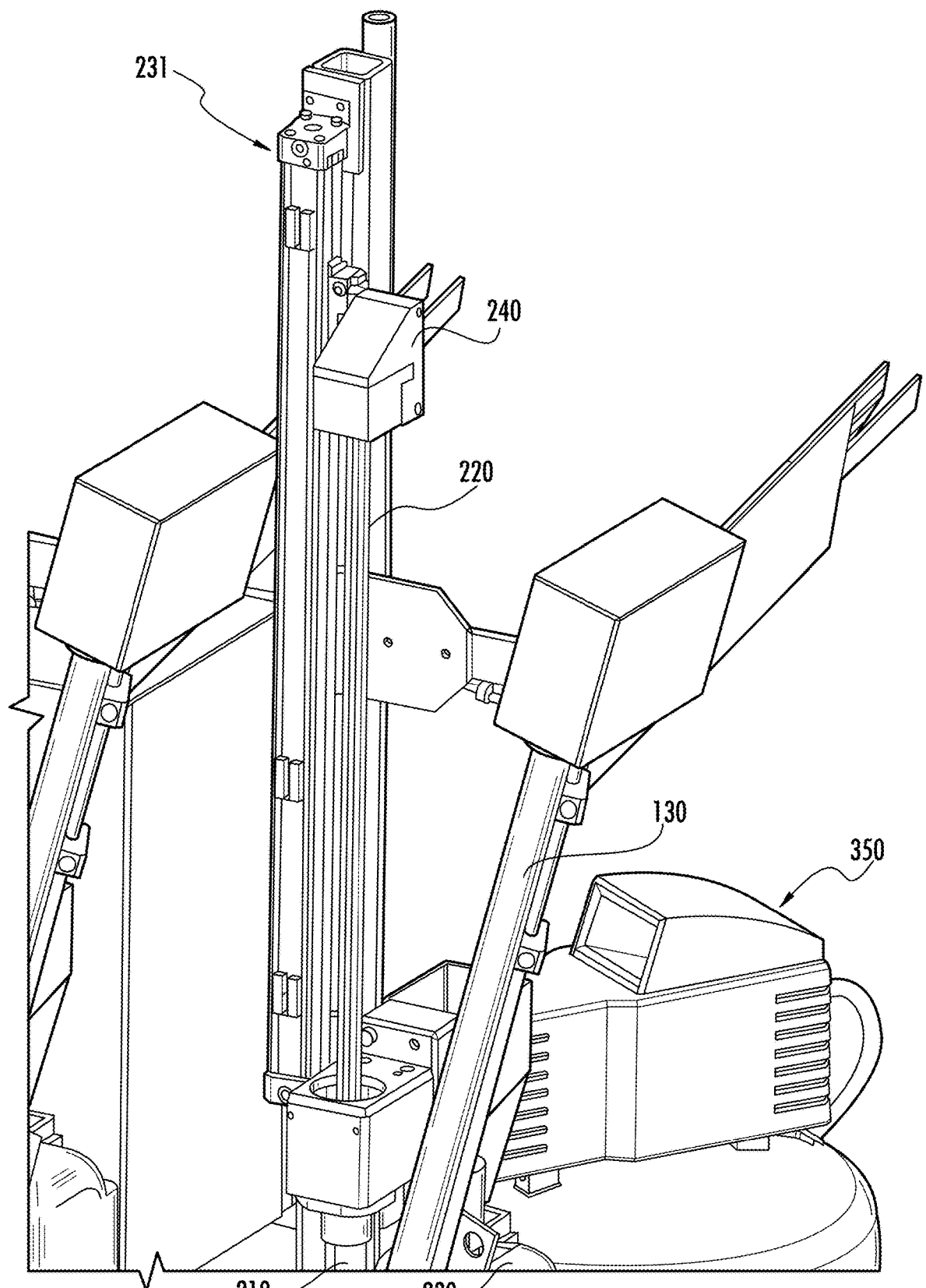
FIG. 11B is partial perspective view of the apparatus of FIG. 1.
Figure 12:
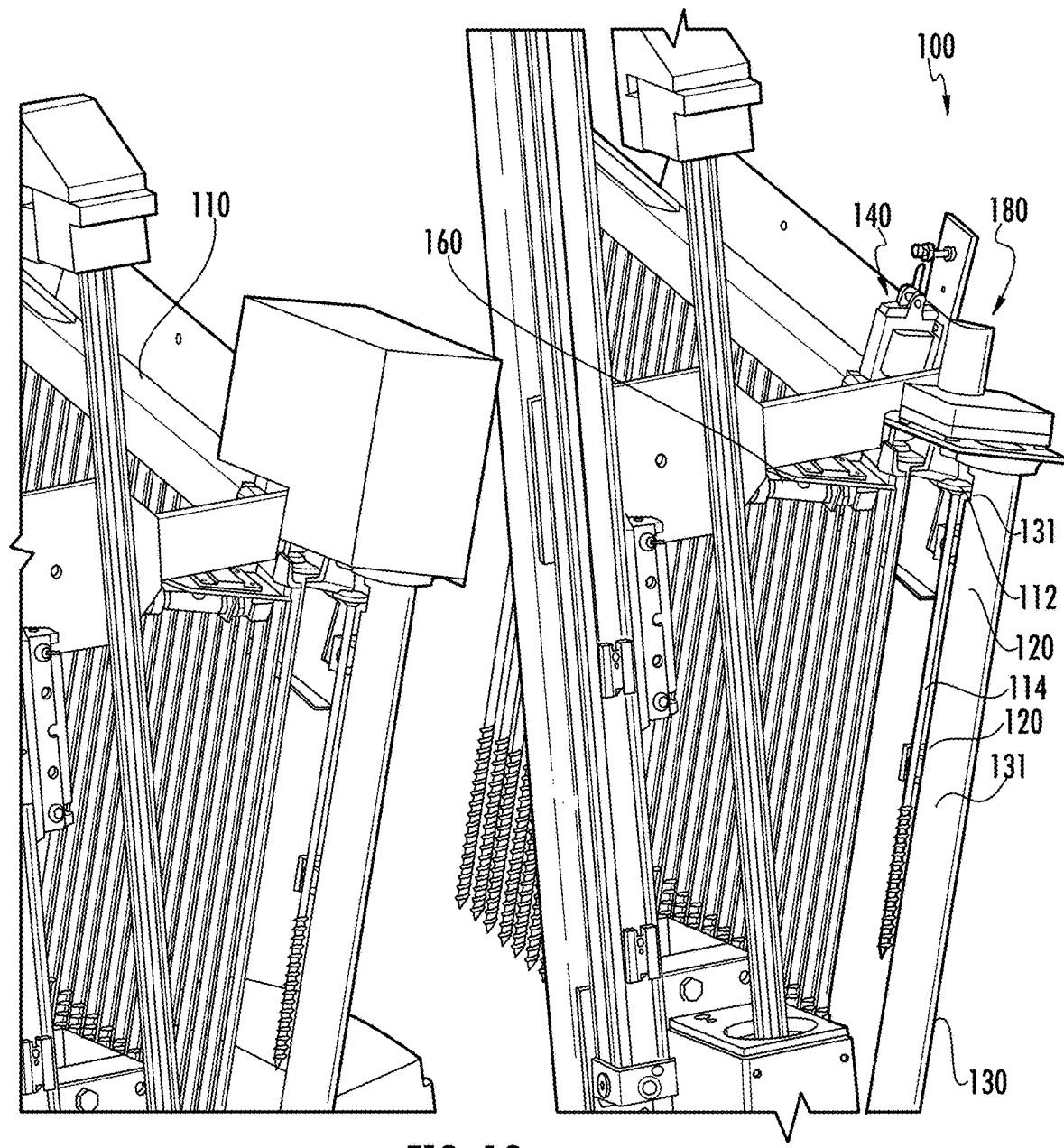
FIG. 12 is a partial perspective view of a screw feeding device.

As shown in FIGS. 11A-11B, the screw assembly 200 can include a screwing device or drill 230, an upright rail system 231, a screw guide tube 210, a screw feeding tube 130, a pneumatic drive 240 powered by the compressor 350, another other related components. The upright rail system 231 can hold the drill 230 or a base 202 of a screw assembly 200. The base 202 may slide vertically along the upright rail system 231.

The drills 230 can be electric, gas, pneumatic drills 230 for screwing or otherwise inserting a fastener 1, such as a screw 1, in the desired position. The drill 230 can be operated by rotating a drive shaft 220 that engages a screw 1 or other fastener 1 to drive the screw 1 into the desired location. The drills 230 of each screw assembly 200 can be operated simultaneously or without the other drills 230 also being operated. Regardless of whether operated simultaneously, offset or in a solo manner, the drills 230 operate independently of each other. As an example, one drill 230 can rotate its drive shaft 220 faster than another drill 230 rotates its drive shaft 220. Thus, even when operated simultaneously or in a joint fashion, the speed and pressure provided by the drills 230 can operated and applied independently to accommodate differences of the fastener insertion points.

Additionally, the pneumatic drive 240 can provide the downward force 241 to drive the screw 1 into the workpiece 2 while the drill 230 rotates the drive shaft 220. The compressor 350 provides the downward force 241 to move pneumatic drive 240 down to drive in a screw and up to return to a rest position 222. Because each drill 230 has an independent upright rail system 231, each pneumatic drive 240 can descend its respective drive shaft 220 at an independent rate to account for differences in wood that results in screws 1 being inserted at different rates. In some embodiments, the compressor 350 may enable the downward force 241 to move the pneumatic drive 240, and further enable an upward force 242 to return the draft shaft 220 to the rest position 222.

The screw guide tubes 210 can be respective cylindrical tubes concentric with the drive shaft 220 of the respective drill 230. The screw guide tubes 210 can hold the screw 1 in place because the screw guide tubes 210 can be dimensioned with an internal diameter that is only slightly larger than the outer diameter 113 of head 112 of a screw 1 or other fastener 1. Further, the proximal ends 211 of the screw guide tubes 210 that are adjacent to the workpiece 2 provides a visual indication of the screw insertion point. Each proximal end 211 may be have a hole 212 larger than the diameter 113 of the head 112 of the screw 1. A screwing device or drill 230 can drill the screw 1 through the hole 212 at the proximal end 211 of the screw guide tube 210 into the workpiece 2.

Additionally, each screw guide tube 210 can be coupled to the base 202 of a screw assembly 200 to support the screw guide tube 210. The screw assembly base 202 can be slidably connected to the upright rail system 231. Further, each drill 230 can also be coupled to the screw assembly base 202.

The screw guide tubes 210 can include collars 213 around the holes 212 at the proximal end 211 of the screw guide tubes 210. The collars 213 can be press fit on the proximal ends 211 of screw guide tubes 210. In one arrangement, collars 213 can be press-fit on the screw guide tubes 210. The internal diameter of the collars 213 can be slightly larger than the exterior diameter of the screw guide tubes 210. Further, the collars 213 can have an internal annular seat or groove with an internal diameter that is larger than the internal diameter of the collars 213.

The screw guide tube 210 may have a side aperture 214 coupled to a second opening 132 of the screw feeding tube 130 of the screw feeding device 100. The second opening 132 may be located near a bottom end 133 of the screw feeding tube 130. A screw 1 may drop from the bottom end 133 of the screw feeding tube 130 into the screw guide tube 210. Accordingly, the screw guide tube 210 receives the screw 1 from the screw feeding device 100.

Referring back to FIG. 4, the screw guide tubes 210 can include ports 215. The ports 215 provide a cutout for visual inspection of the interior of the respective screw guide tubes 210 and the drive shafts 220. The ports 215 can also be used to visually inspect, access and change the drive shafts 220 of screwing devices 230. In an embodiment, the drive shaft 220 may disengage from the screwing device 230 at a connection point 223 accessible through the port 215 in the screw guide tube 210. The ports 215 can also be used to clear any cuttings, dust or other debris that may accumulate in the respective screw guide tubes 210 during operation.

A screw guide tube 210 can include an upper portion 216 that houses the drive shaft 220. A lower portion 217 of the screw guide tube 210 can be dimensioned to receive the single screw from the screw feeding device 100. The drive shaft 220 can be lowered through upper portion 216 of the screw guide tube 210 so that the tip 221 of the drive shaft 220 engages the head 112 of the received screw 1. The drive shaft 220 can have a tip 221 dimensioned to fully engage the screw head 112 as the drive shaft 220 moves toward the proximal end 211 of the screw guide tube 210.

Figure 24:
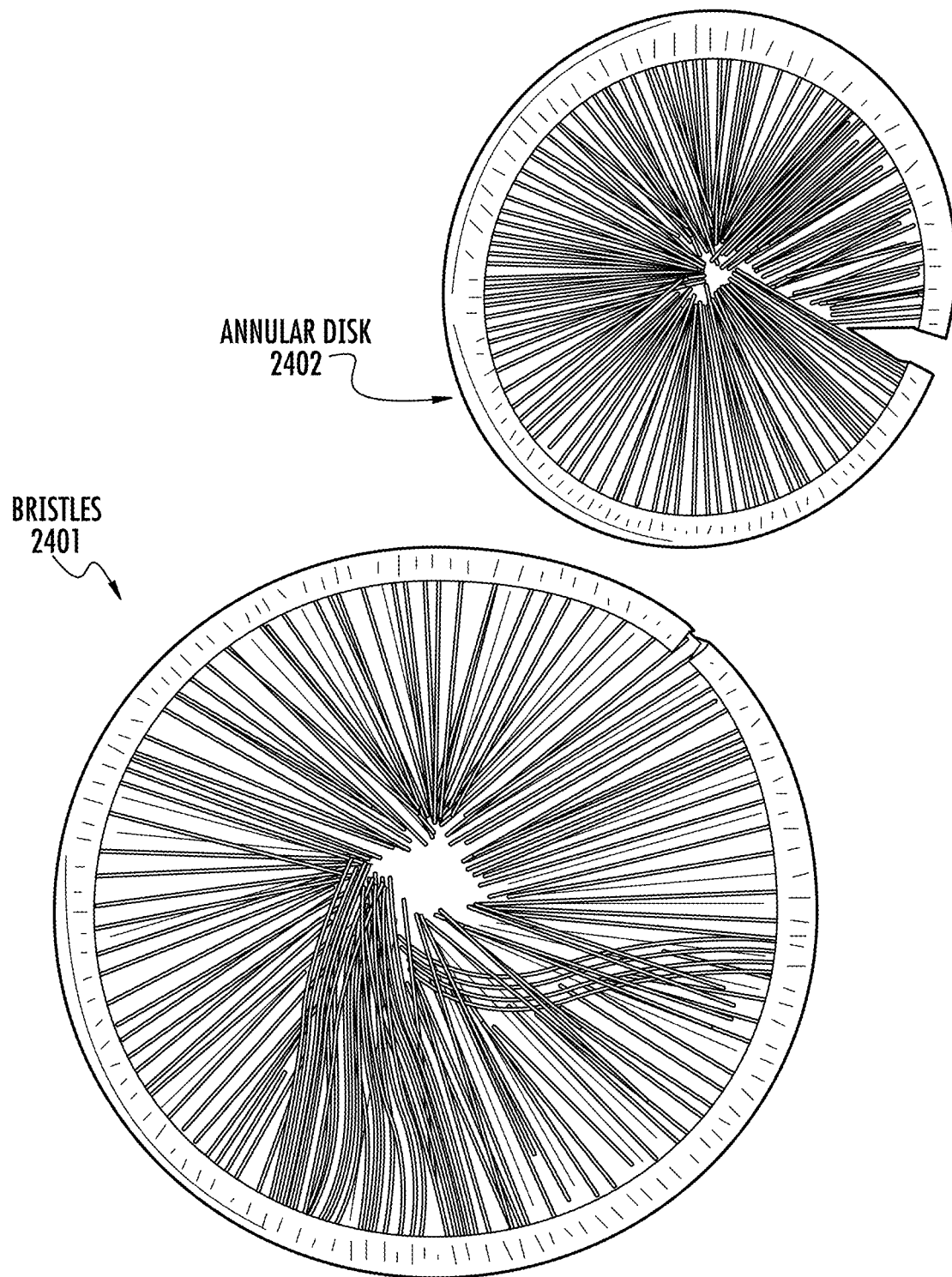
FIG. 24 is a view of a component of an apparatus according to an embodiment of the present disclosure.
Figure 25A:
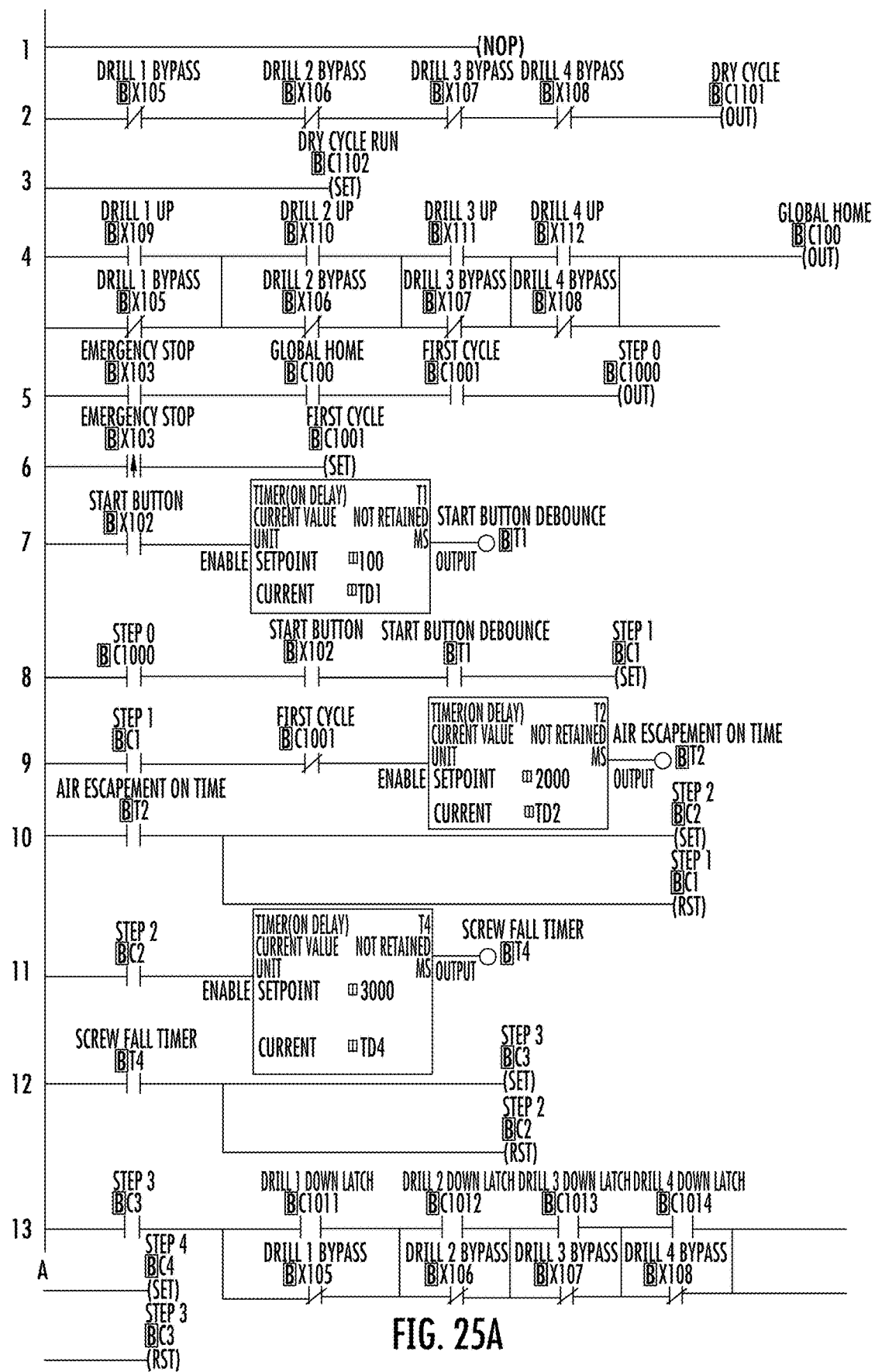
Figure 25B:
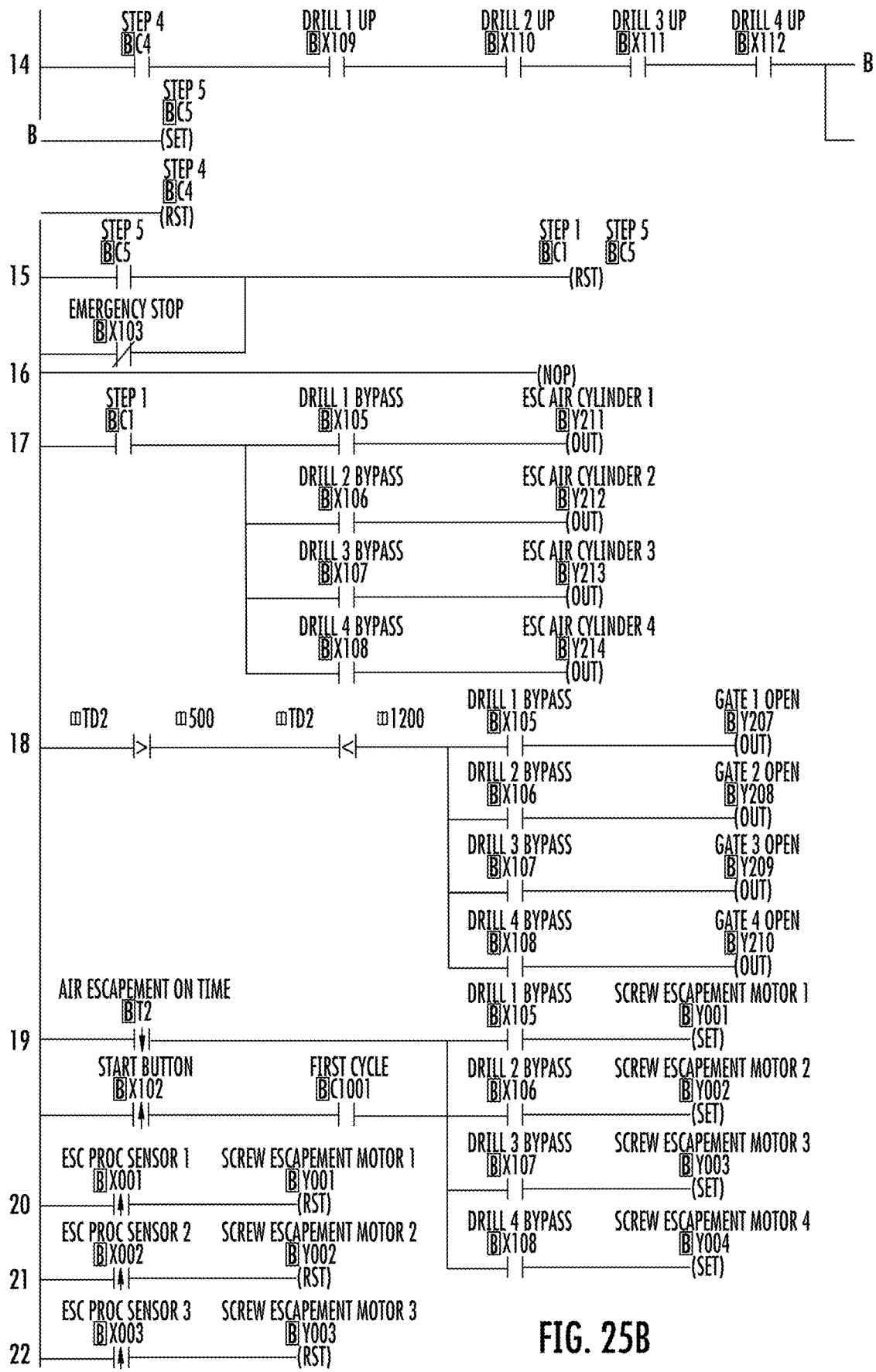
Figure 25C:
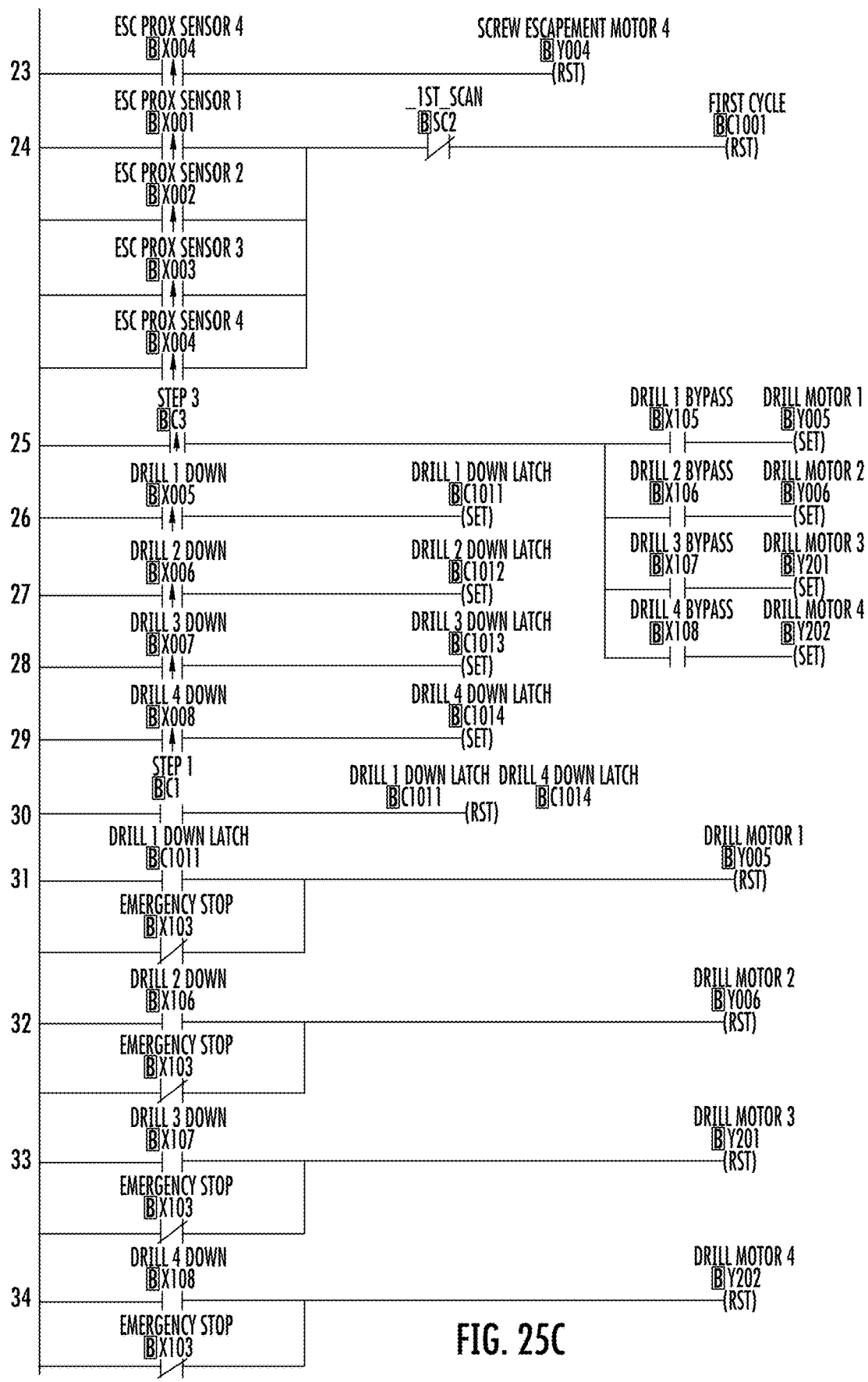

The interior surface 218 of screw guide tubes 210 can include a plurality of bristles 2401, shown in FIG. 24, for centering and holding the insertion point of a screw 1 in a proper position prior to engagement by a drill shaft 220 of a drill 230. Each bristle 2401 can project inward towards the center 219 of a respective screw guide tube 210. The bristles 2401 can be embedded in an incomplete annular disk 2402 that has a diameter the substantially same as an inner diameter of the respective screw guide tube 210. The annular disk 2402 with plurality of bristles 2401 can be inserted into the respective screw guide tube 210 and seat in an annular groove of the collars 213. Additionally, if the plurality of bristles 2401 wear over time or use, the annular disk 2402 with plurality of bristles 2401 can be replaced.

Figure 7:
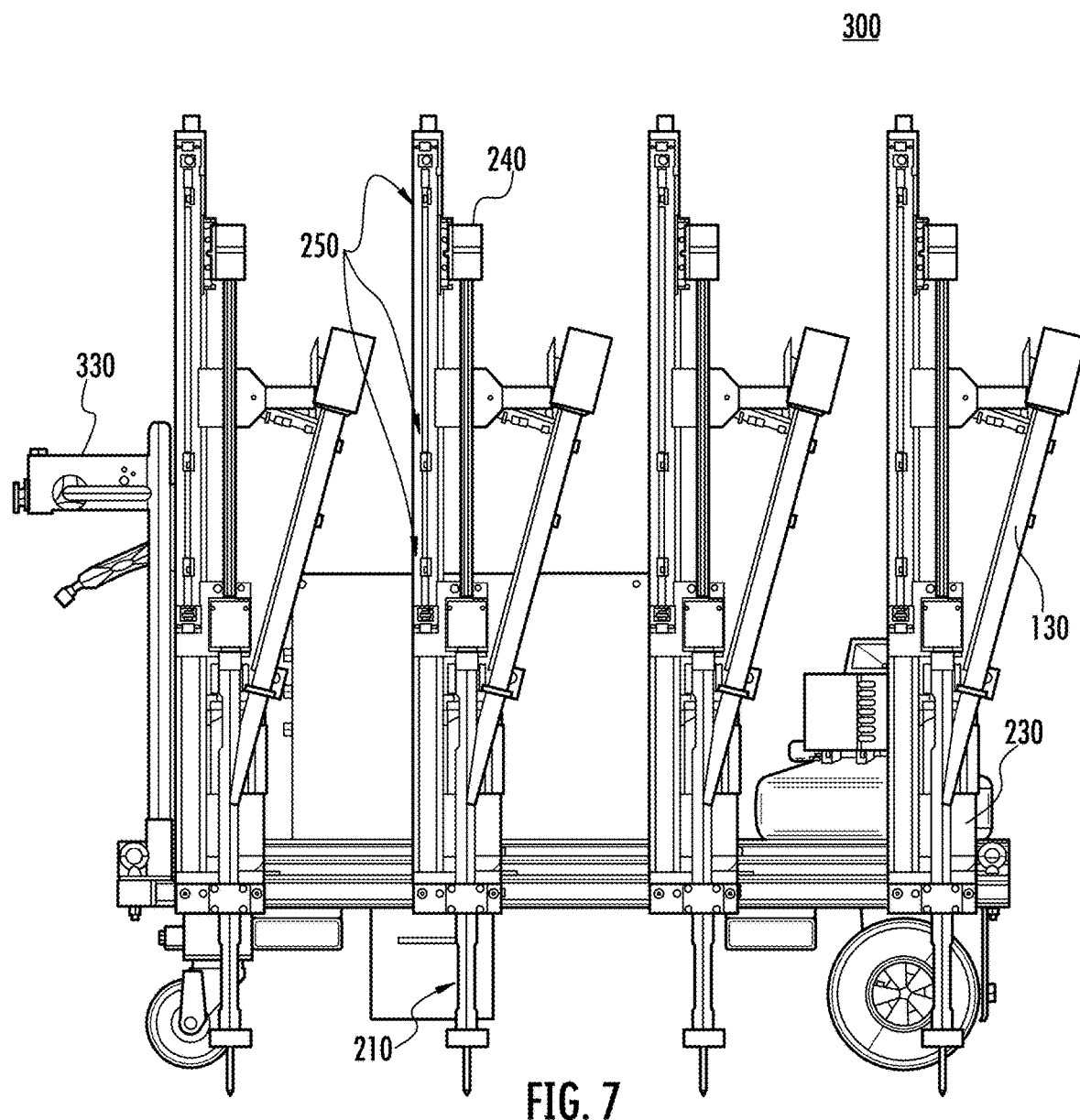
FIG. 7 is another side view of the apparatus of FIG. 1.

As shown in FIG. 7, the screw feeding tube 130 are connected to a respective screw guide tube 210. The screw feeding tubes 130 can be cylindrical and dimensioned to be larger than the largest diameter of a fastener 1, such as a screw 1. With such dimensions, a screw 1 can be dropped down a respective screw feeding tube 130 and gravity will carry the screw 1 to its intended location. A respective screw feeding tube 130 can join a respective screw guide tube 210 such that the interior of a screw feeding tube 130 allows a screw to easily and without obstruction pass to the interior of a respective screw guide tube 210. In one example, the screw feeding tubes 130 can have the same diameter as the diameter of the respective screw guide tubes 210. To accommodate different size screws 1 with a single apparatus 300, the screw feeding tube 130 can have the same diameter as the diameter of the screw guide tube 210, and the other screw feeding tube 130 and the other screw guide tube 210 where the diameter of the screw feeding tubes 130 are different.

The screw assembly 200 can also include limit switches or stops 250. The limit switches or stops 250 disengage the pneumatic drive 240 and/or drill 230 to stop the pneumatic drive 240 and/or drill 230 at a bottom or desired position.

As shown in FIGS. 12-15A, the screw assembly 200 can also include an automated screw feeding device 100. The screw feeding device 100 can include a screw rack 110, a solenoid 140, an air piston 160, an electric screw feeding motor 180, and a rotatable rod 170 to which magnetic screw grips 120 are coupled.

Figure 13:
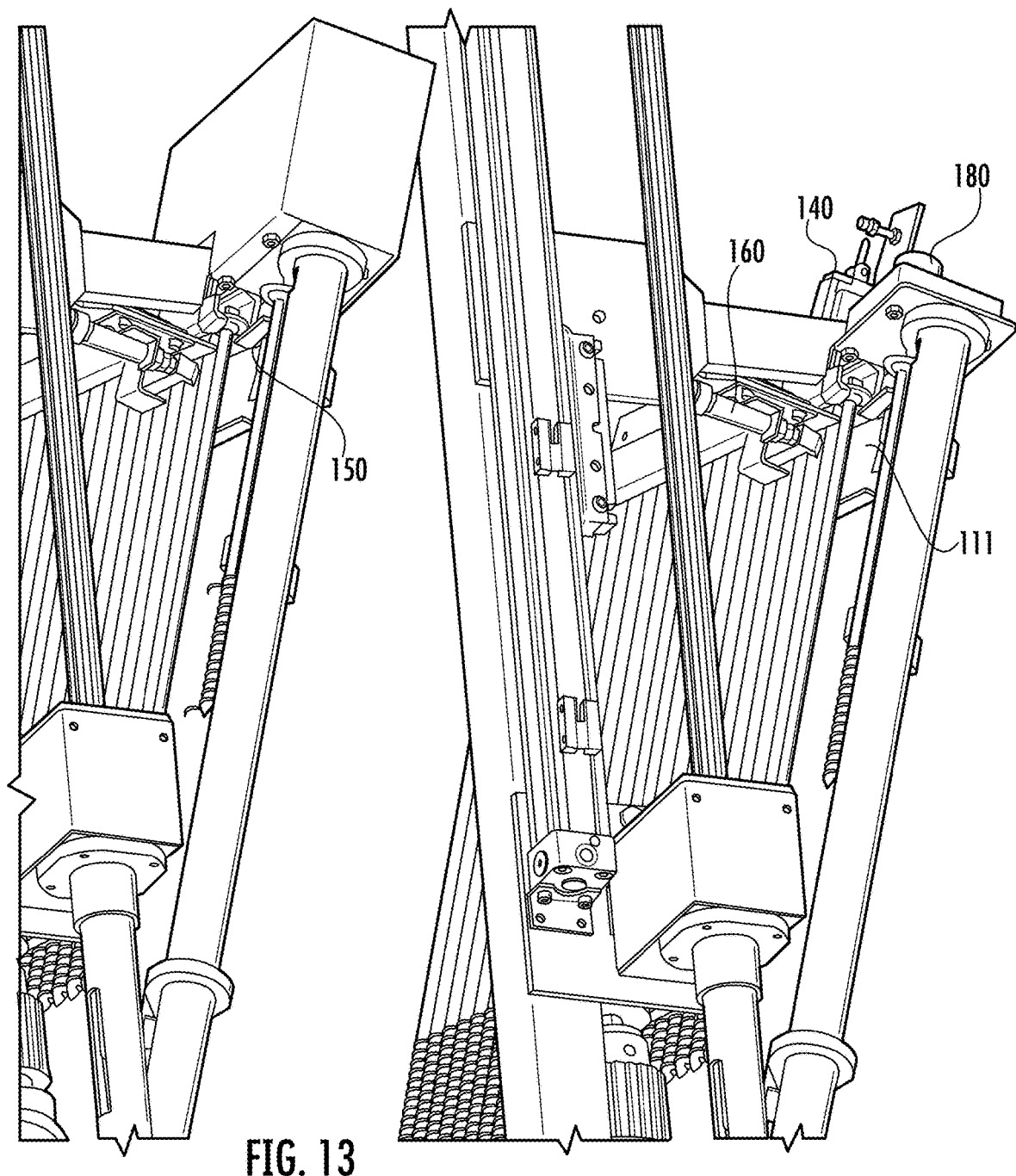
FIG. 13 is another partial perspective view of a screw feeding device.
Figure 14:
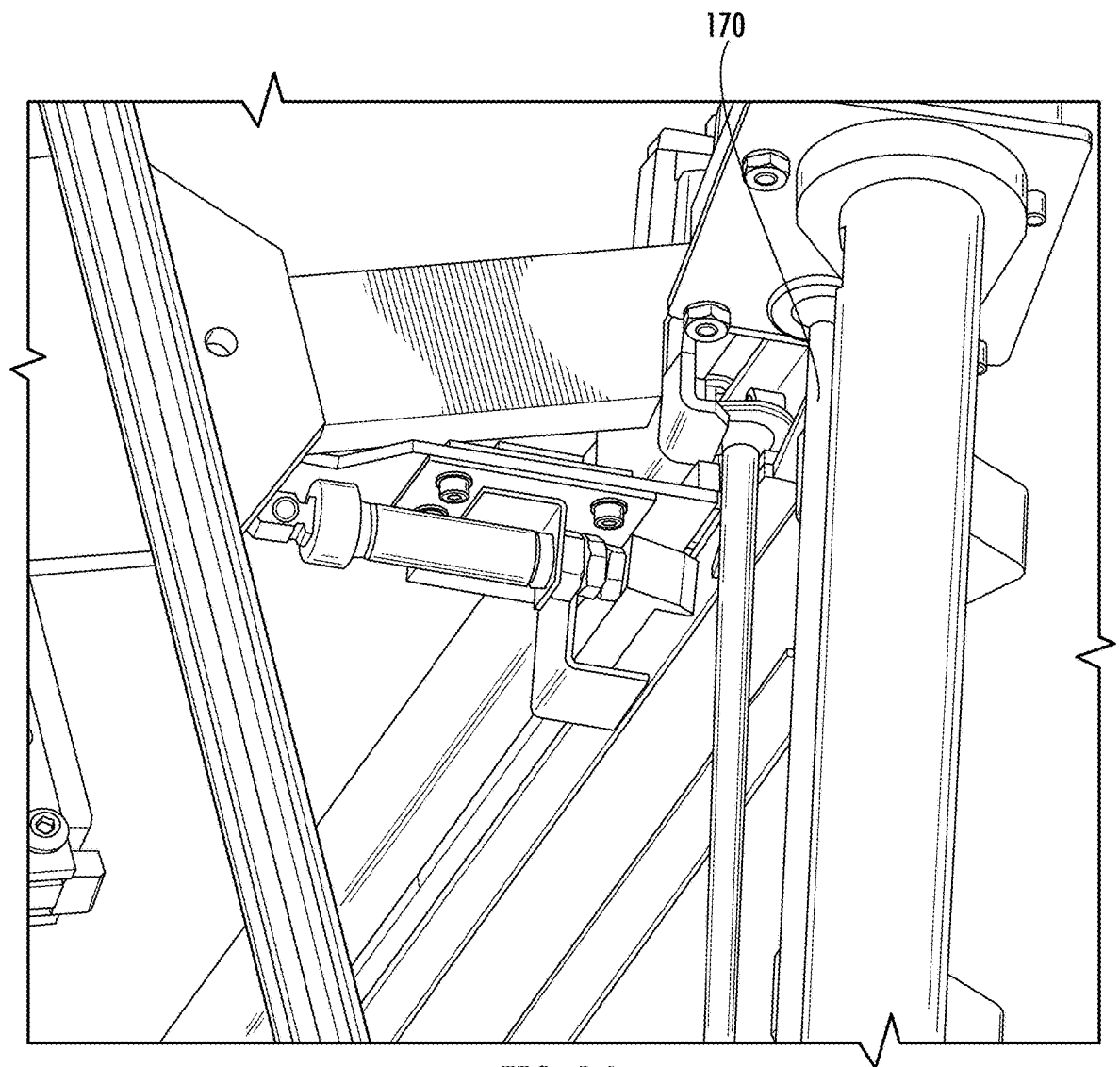
FIG. 14 is another partial perspective view of a screw feeding device.
Figure 15A:
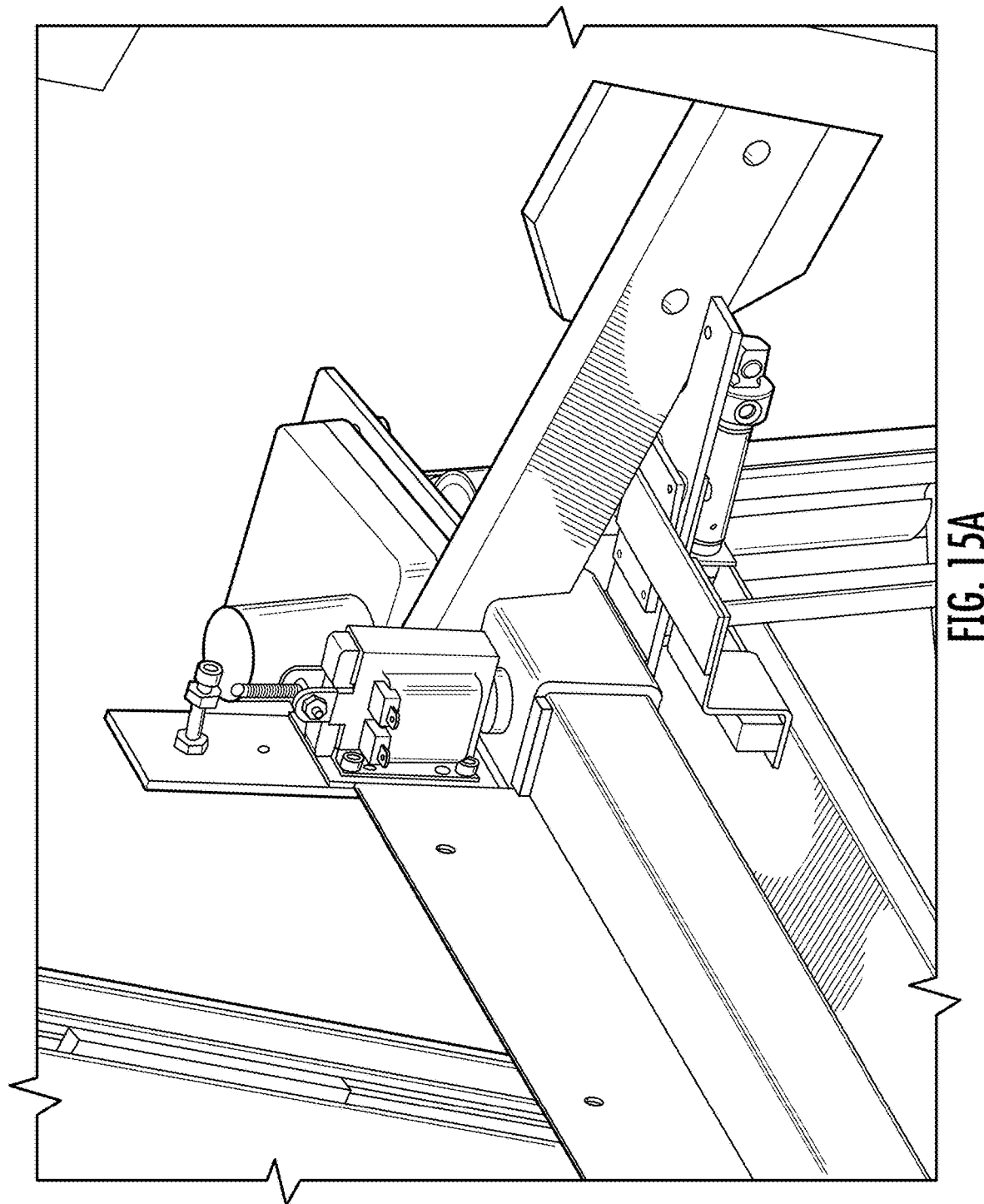
FIG. 15A is another partial perspective view of a screw feeding device.
Figure 15B:
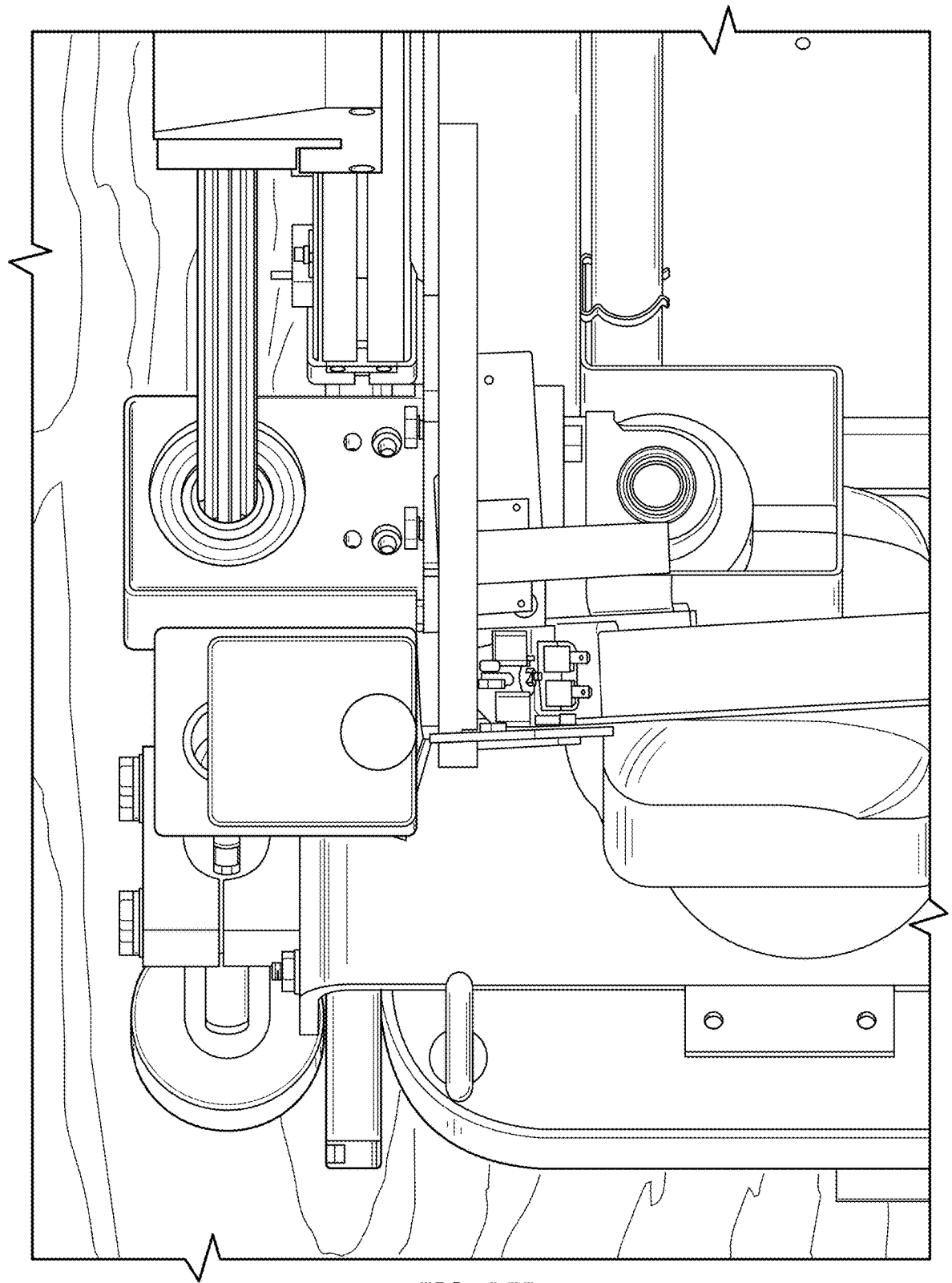
FIG. 15B is another partial perspective view of a screw feeding device.
Figure 15C:
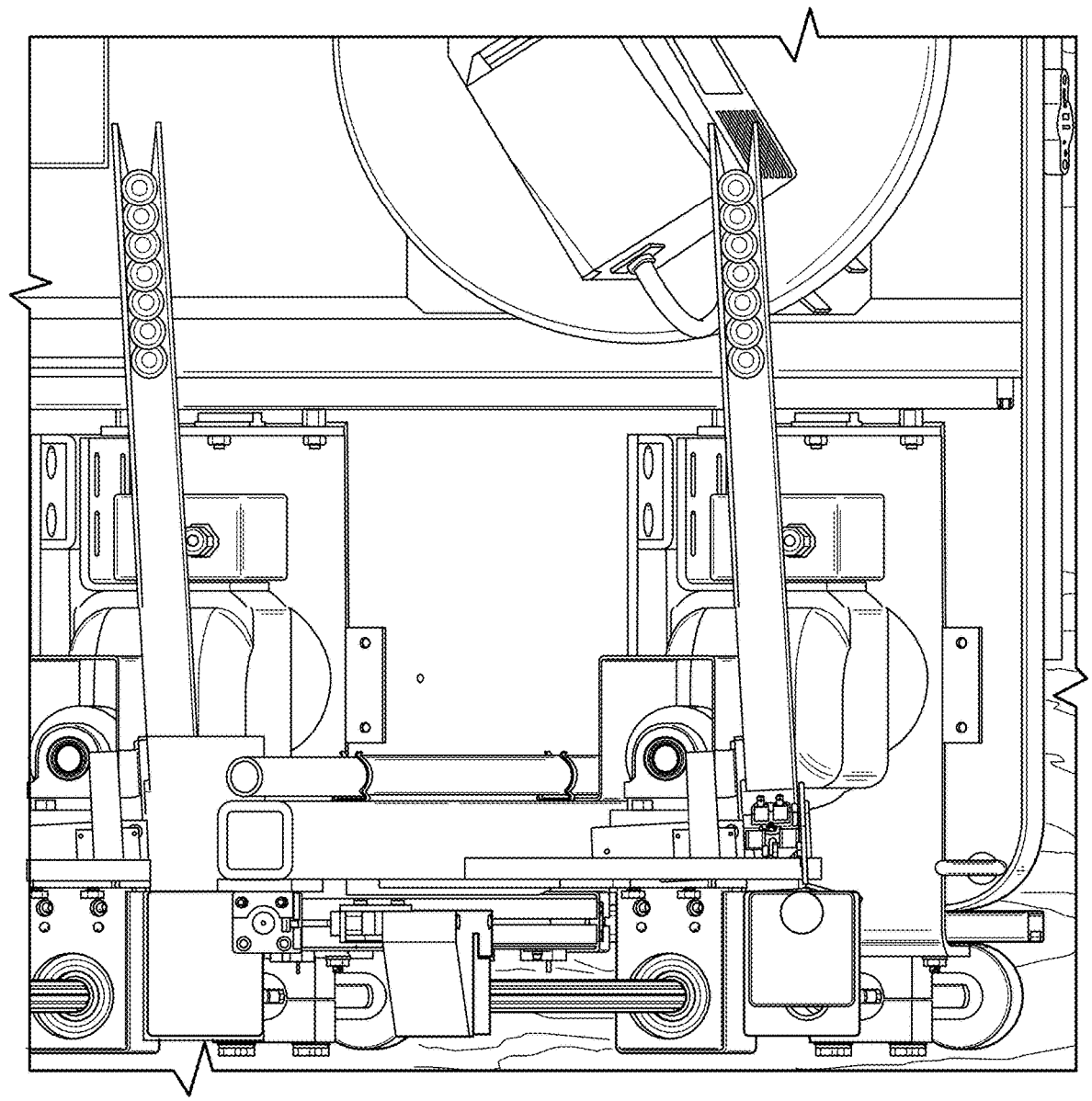
FIG. 15C is another partial perspective view of a screw feeding device.

The screws 1 can be loaded into the screw rack 110 that has a slot large enough to allow the screw shaft 114 of the screw 1 to freely pass but small enough to maintain the head 112 of the screw 1. The screw rack 110 can be angled toward the ground or workpiece 2 to allow gravity to force the screws 1 forward. At the work end of the screw rack 110, a solenoid 140 can be provided. As shown in FIG. 13, the solenoid 140 can de-energise to move upward and allow a single screw to advance to a holding area 111. When not energized, the solenoid 140 to maintains the screws 1 in the screw rack 110.

The air piston 160, which is also powered by the compressor 350, can be engaged to slidably advance the screw 1 to and through the screw guide bracket 150. The screw 1 is advanced until it comes into contact with the magnetic screw grips 120 that releasably secure the screw 1. With the screw 1 secured to the magnetic screw grips 120, the screw feeding motor 180 rotates the rotatable rod 170 until the screw 1 is in the screw slot 131, at which point further rotation overcomes the force of the magnetic screw grips 120 to release the screw 1 into an opening 131 of the screw feeding tube 130. In an embodiment, the screw 1 can be dropped into an opening 131 at the top of the screw feeding tube 130. In certain embodiments, the opening 131 is a screw slot 131 along the longitudinal axis of the screw feeding tube 130. Notably, the control computing device 360 can control all of the operations of the screw feeding device 100.

In operation and started from a non-engaged position where the drills 230 are not engaged and pneumatic drives 240 are up, an operator can begin operation by turning on the apparatus 300 via the key switch 337. The operator can use the left and/or right throttles 335 to position the cart 310 into the appropriate position relying on manual movement 315 or motorized movement 315 provided by the motorized wheels 313, depending on the positioning of the foot pedal 318.

The operator can engage the drill button 334 to start the drilling process. Referring back to FIG. 12, the screw feeding device 100 can disengage the solenoid 140, which releases a single screw, which is then advanced by the air piston 160 to and through the screw guide bracket 150. The screw 1 is advanced until it comes into contact with the magnetic screw grips 120 that releasably secure the screw 1. With the screw 1 secured to the magnetic screw grips 120, the screw feeding motor 180 rotates the rotatable rod 170 until the screw 1 is in the screw slot 131, at which point further rotation overcomes the force of the magnetic screw grips 120 to release the screw 1 into the screw slot 131 of the screw feeding tube 130.

Figure 16:
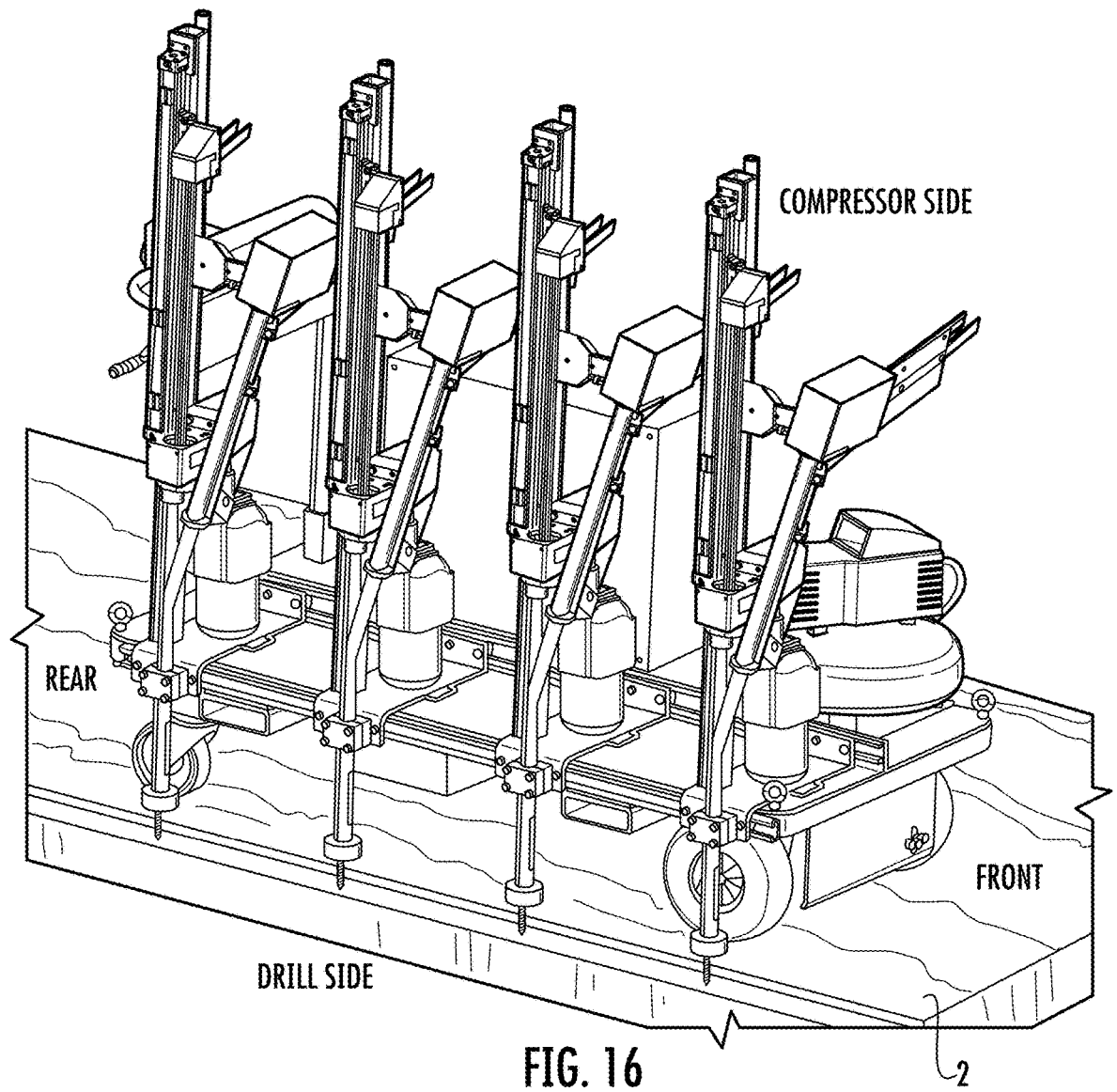
FIG. 16 is a perspective view of an apparatus according to an embodiment of the present disclosure.
Figure 17:
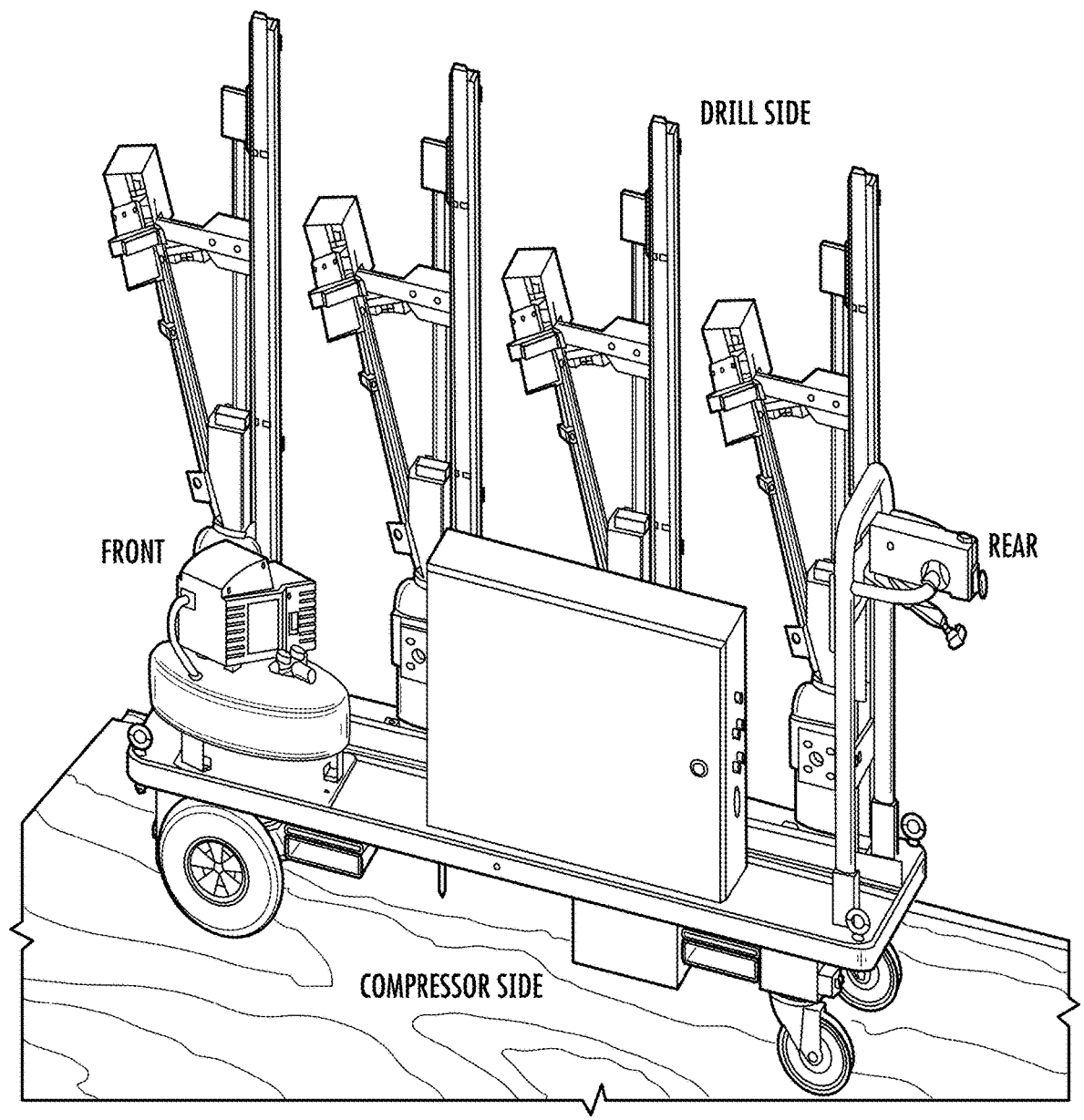
FIG. 17 is another perspective view of the apparatus of FIG. 16.
Figure 18:
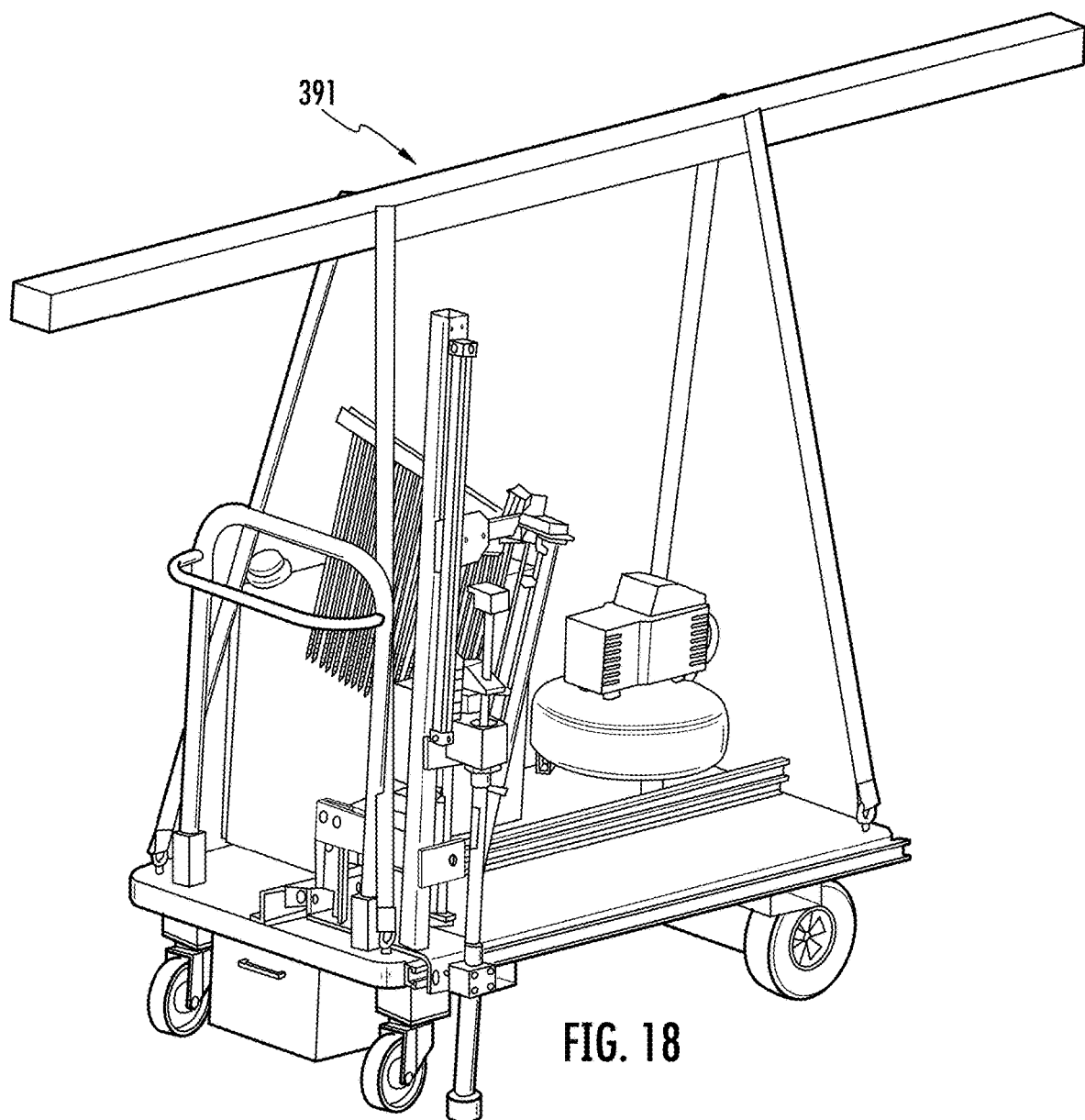
FIG. 18 is another perspective view of the apparatus of FIG. 16.
Figure 19:
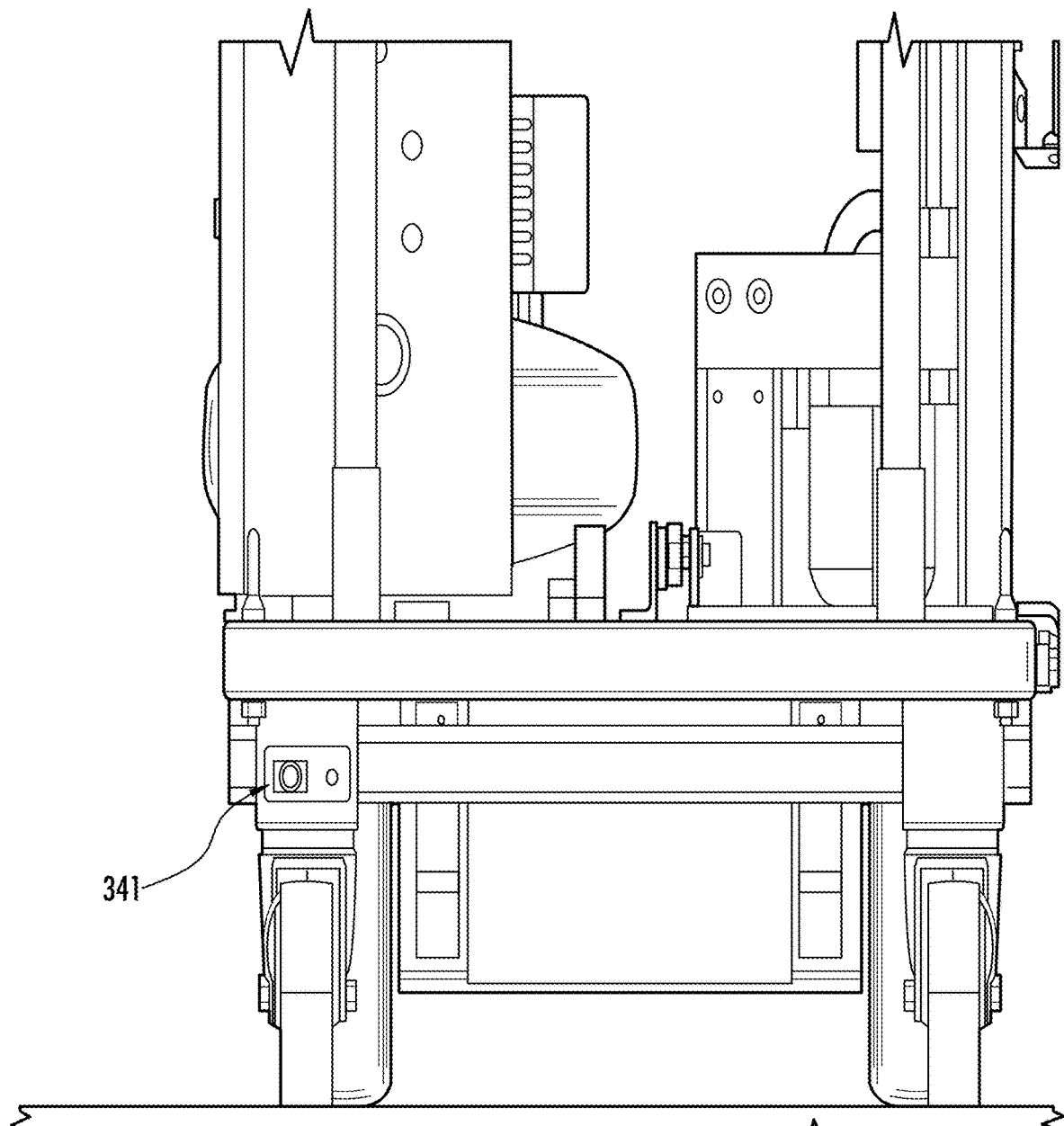
FIG. 19 a rear view of the apparatus of FIG. 16.
Figure 20:
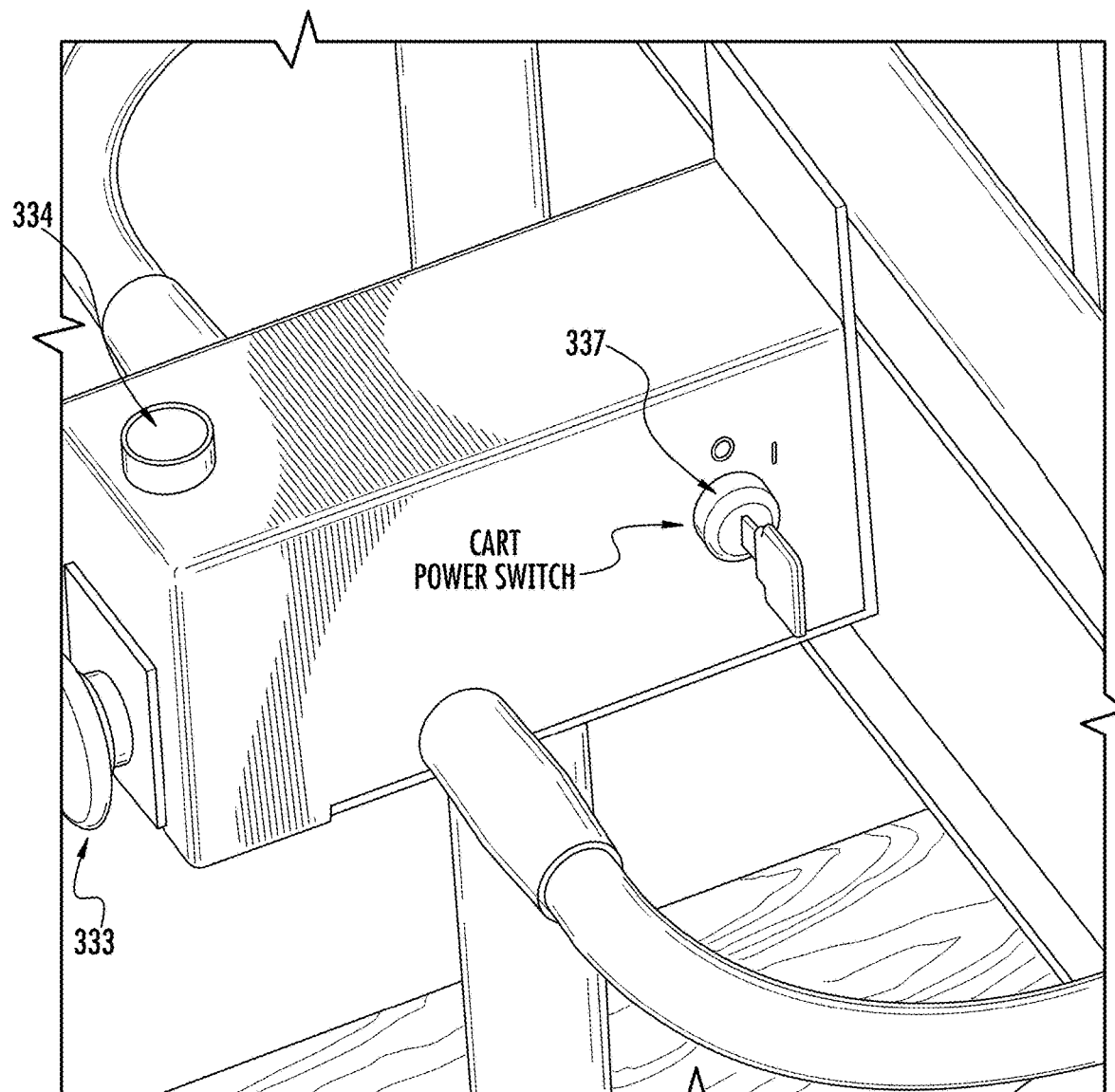
FIG. 20 is another perspective view of the apparatus of FIG. 16.
Figure 21:
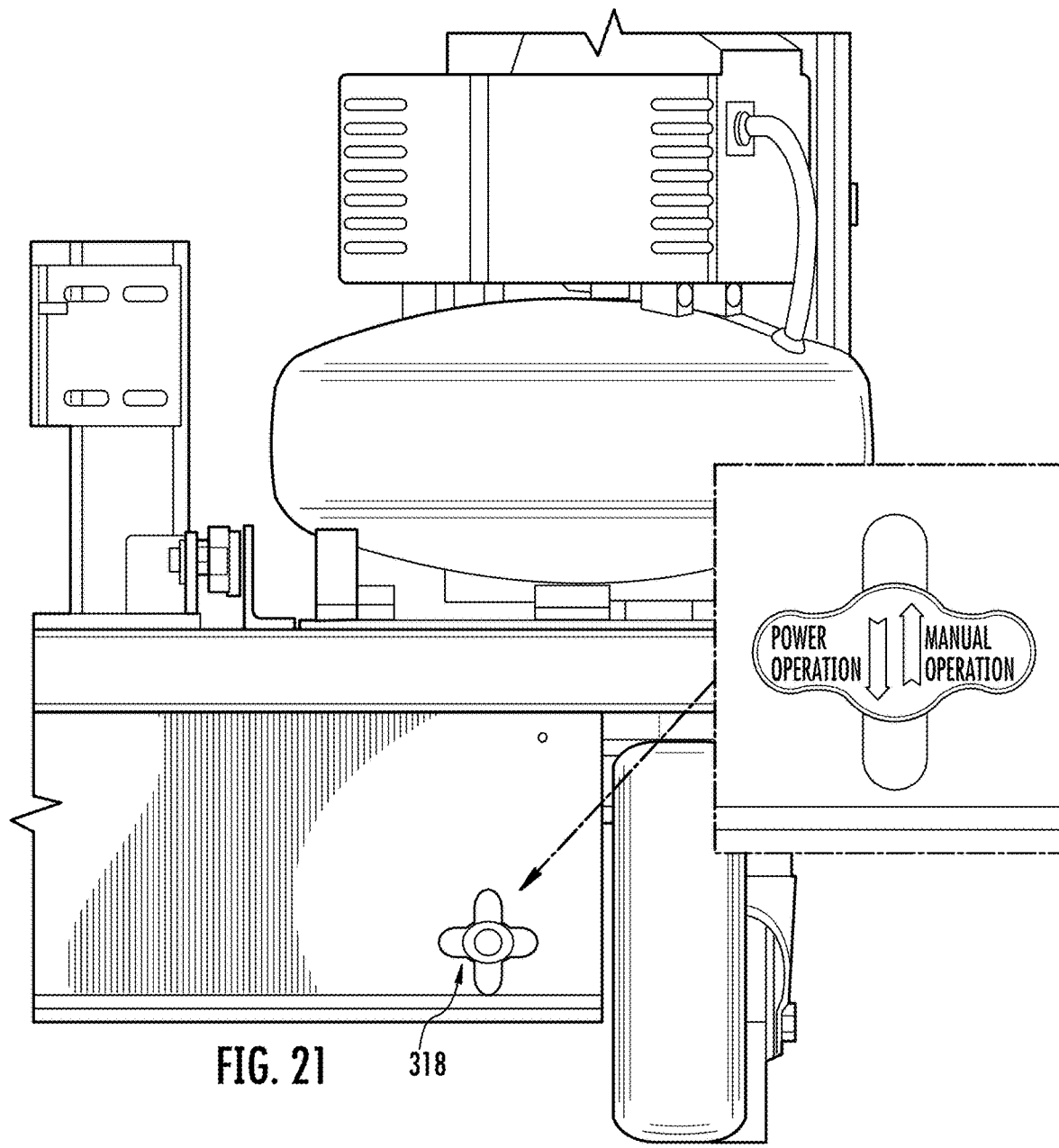
FIG. 21 is a partial view of the apparatus of FIG. 16.
Figure 22:
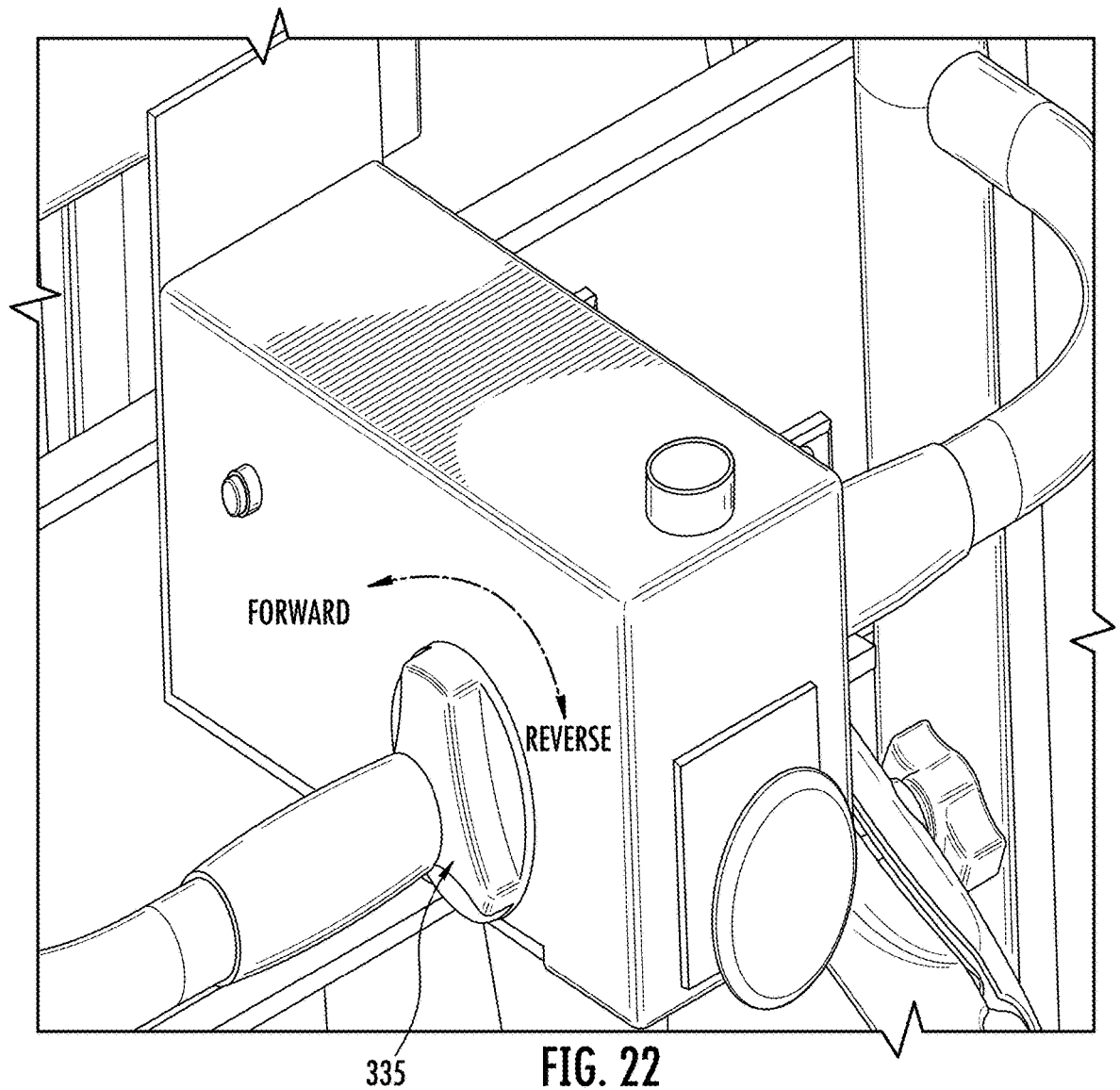
FIG. 22 is another partial view of the apparatus of FIG. 16.
Figure 23:
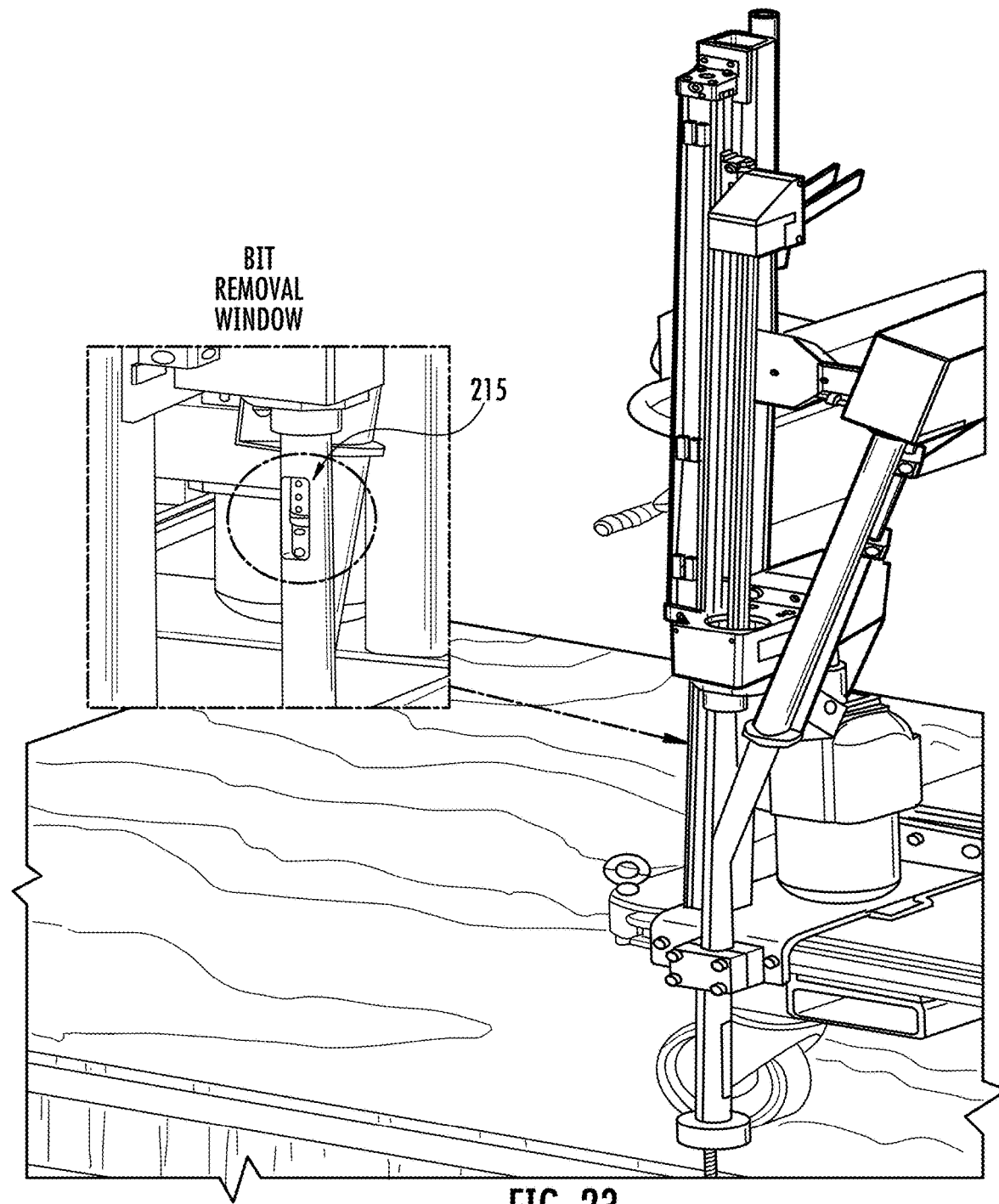
FIG. 23 is a close-up partial view of the apparatus of FIG. 16.

The screw 1 can then descend down the screw feeding tube 130 and into the screw guide tube 210. The plurality of bristles 2401 will center the insertion point of the screw 1 against the workpiece 2 to insure that the screw 1 is inserted roughly perpendicular to the workpiece 2. Referring to FIGS. 16-17, the drill 230 can rotate the drive shaft 220 to turn the screw 1 and the pneumatic drive 240 can descend to drive the drive shaft 220, and ultimately the screw 1, into the workpiece 2. Referring back to FIG. 7, the limit switches 250, which are placed a predetermined positions, can stop the pneumatic drive 240 and drill 230 at the appropriate screw insertion depth and then the pneumatic drive 240 returns the drive shaft 220 to the rest position 222 to await the next screw. As shown in FIG. 18, the deck also can provide a counterbalance weight 391 to ensure stability of the apparatus 300 in operation. Referring to FIGS. 19-21, an apparatus 300 can include a key switch 337, an emergency shutoff switch 333, a drill button 334, charging port 341, control lever or foot pedal 318, directional cart throttles 335

The operator can advance the cart 310 to the next insertion point. The visual indicator or laser will mark the next assertion point when the cart 310 has advanced the appropriate distance. The user can move the cart 310 forward until the appropriate distance for the next screw insertion is reached as indicated by the visual indicator or laser projecting opposite from the direction of operation and at an angle. In on embodiment, the cart 310 will be advanced the desired distance when the visual indicator or laser projects a beam that that will touch the immediately prior inserted screw.

When the projected beam touches the prior inserted screw, the cart 310 and its components will be at the desired location to insert the next screw. The visual indicator or laser provides for uniform placement of sets of screws 1 at predetermined distances from one another. When desired, the distances between successive sets of screw placement can be changed by adjusting the angle at which the beam is projected.

Referring to FIGS. 25A-D, a logic and schematic diagram of the operations controlled by the control computing device 360 are provided. Additionally, FIGS. 25A-D provide an exemplary configuration of the components of the apparatus 300 and how such components are connected and communicate with each other.

Figure 26:
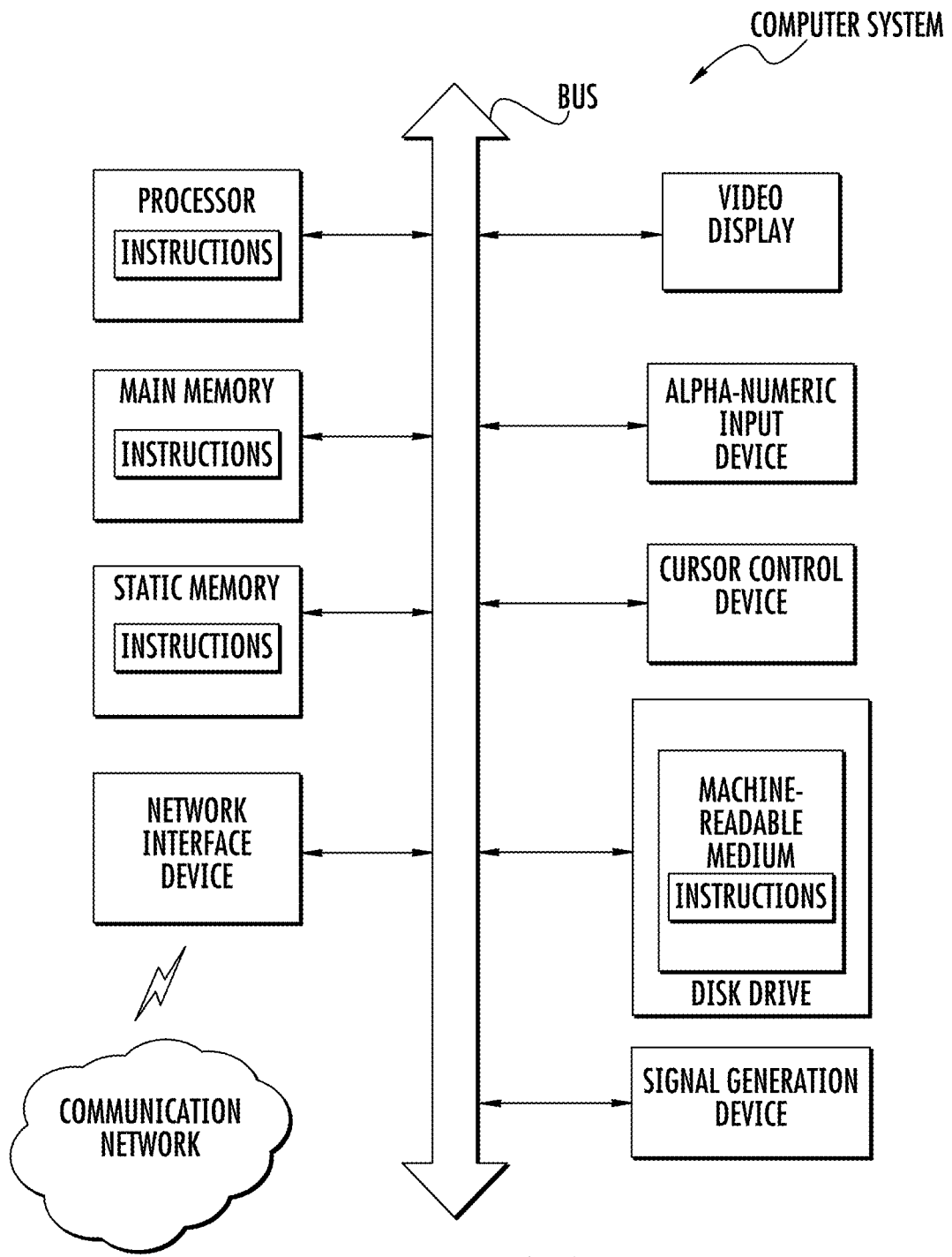
FIG. 26 is schematic of components of the control computer system.

Referring now also to FIG. 26, at least a portion of the methodologies and techniques described with respect to the exemplary embodiments of the mobile and modular apparatus 300 and the accompanying cart 310 can incorporate a machine 360, such as, but not limited to, a computer system or other computing device 360 within which a set of instructions, when executed, may cause the machine 360 to perform any one or more of the methodologies or functions discussed above. The machine 360 may be configured to facilitate various operations conducted by the mobile and modular apparatus 300, its components, or a combination thereof. For example, the machine 360 may be configured to, but is not limited to, assist the cart 310 by providing processing power to assist with processing loads experienced in the apparatus 300 and/or its components, by providing storage capacity for storing instructions 362 or data 401 traversing the apparatus 300, or by assisting with any other operations conducted by the apparatus 300.

In an embodiment, the apparatus 300 can perform an action 370 in response to input 365 received and processed by a processor 363 of the computer control system 360. The action 370 may include activating the screw feeding device 100 to feed a single screw 1 to the screw guide tube 210, activating the screwing device/drill 230 to rotate the drive shaft 220, and activating the pneumatic drive 240 to drill the received screw 1 into the workpiece 2. Data 401 may be generated based on the performance 402 of operations 364 performed by the apparatus 300. The data 401 may be logged for later review by an operator. In some embodiments, the computer control system 360 may transmit the data 401 to an external device 400. In certain embodiments, updated input 403 may be received from the external device 400 in order to improve the performance 402 of the apparatus 300.

Figure 27:
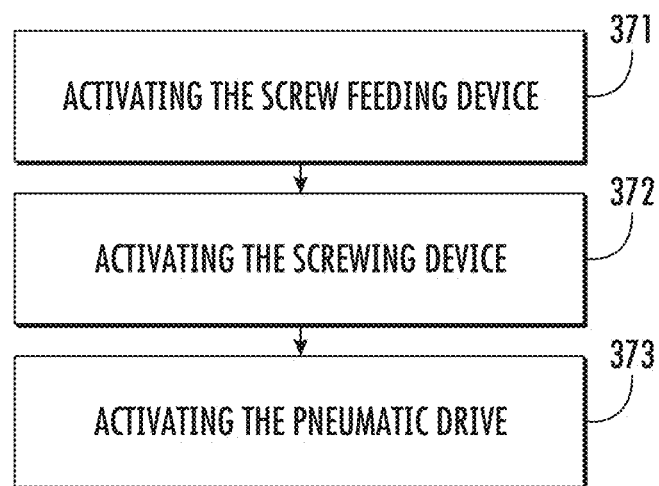
FIG. 27 is a flowchart illustrating steps for controlling the apparatus of FIG. 1.
Figure 28:
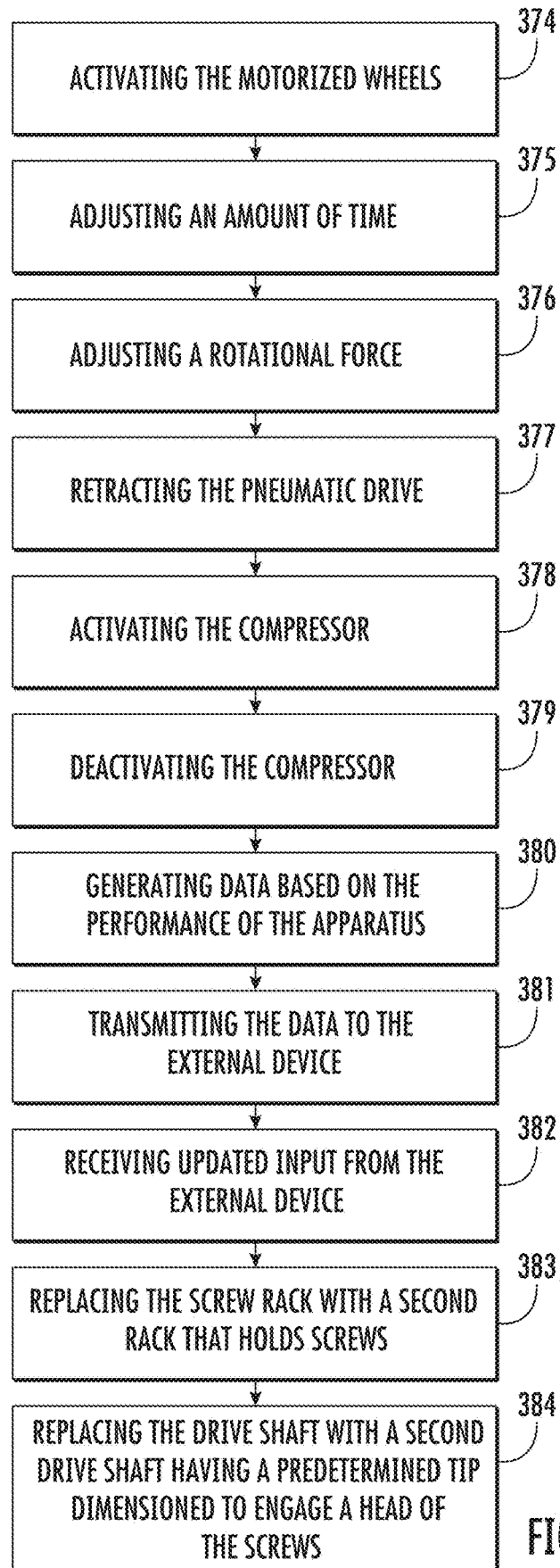
FIG. 28 is a flowchart illustrating additional steps for controlling the apparatus of FIG. 1.

The present disclosure may be embodied in various forms, including without limitation, the apparatus 300 for providing a mobile and modular platform for drilling screws 1 into a workpiece 2 and a method of controlling the apparatus 300. As shown in FIG. 27, such a method may include the steps of activating the screw feeding device (step 371), activating the screwing device (step 372) and/or activating the pneumatic drive (step 373). These steps may cause the drilling of a screw 1 into a workpiece 2. As shown in FIG. 28, the method may also including any of the following steps: activating the motorized wheels (step 374), adjusting an amount of time (step 375), adjusting a rotational force (step 376), retracting the pneumatic drive (step 377), activating the compressor (step 378), deactivating the compressor (step 379), generating data 401 based on the performance 402 of the apparatus 300 (step 380), transmitting the data 401 to the external device 400 (step 381), and/or receiving updated input 403 from the external device 400 (step 382). The aforementioned steps may comprise the specific actions 370 instructed by the machine 360.

The method may further include the step of replacing the screw rack 110 with a second rack 110 that holds another plurality of screws 1 (step 383). The method may also include the step of replacing the drive shaft 220 with a second drive shaft 220 having a predetermined tip 221 dimensioned to engage a head 112 of each of the second plurality of screws 1 (step 384). The first drive shaft 220 may be replaceable and adapted to disengage from the screwing device 230 at a connection point 223 accessible through the port 215 in the screw guide tube 210. The second drive shaft 220 may be adapted to engage the screwing device 230.

Figure 29A:
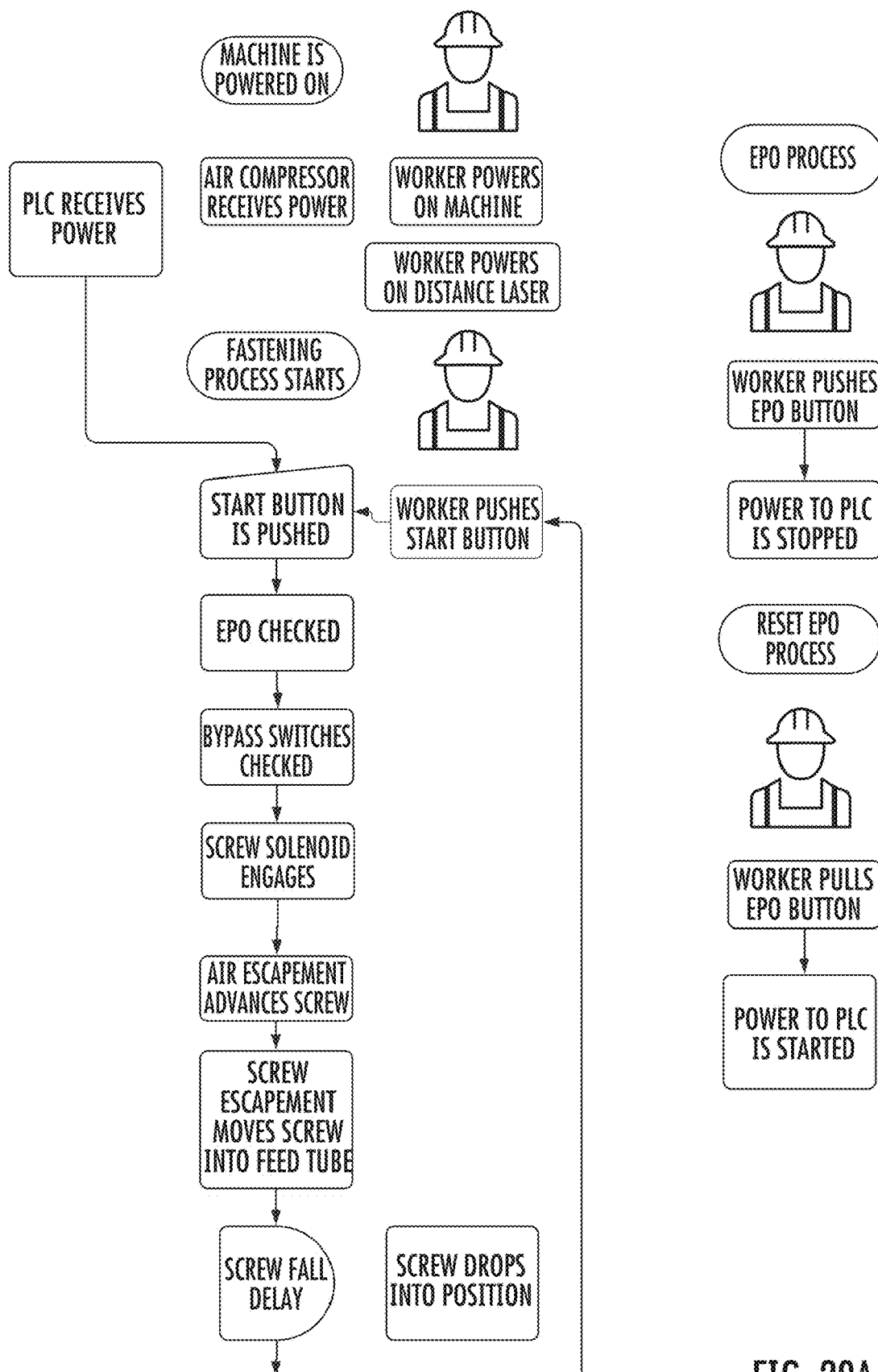
FIGS. 29A-B is a flowchart illustrating steps for operating the apparatus of FIG. 1.
Figure 29B:
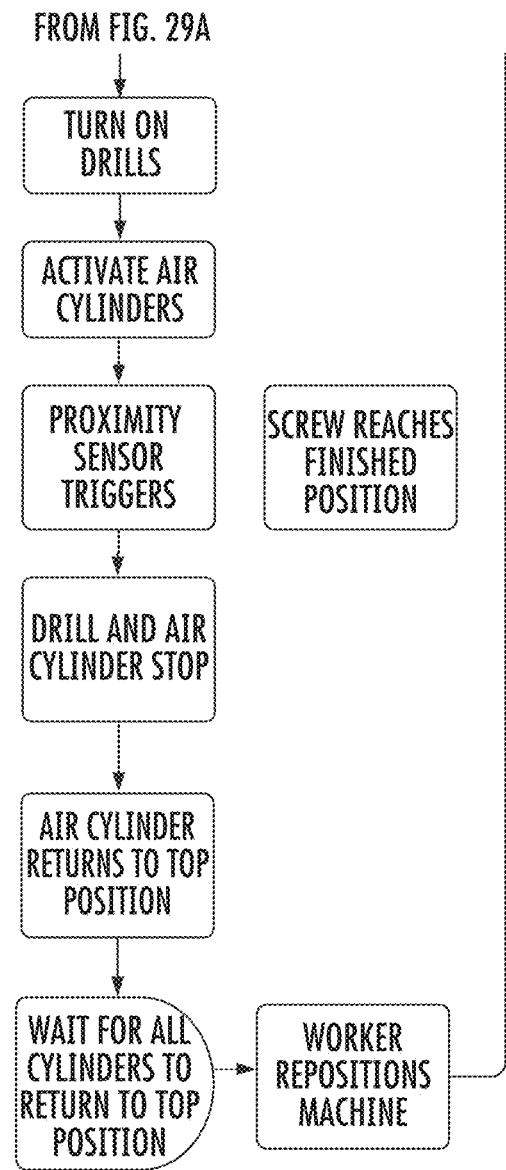

The present disclosure may also be embodied in a method of operating the apparatus 300, as shown in FIGS. 29A-B. The components of the apparatus 300 may be powered on by an operator or worker. This may include powering on the screwing device or machine 230, the distance laser 336, the air compressor 350, and the programmable logic controller (PLC) or computer control system 360. The fastening process may then commence, e.g. two or more work pieces 2 may be fastened together by the insertion of fasteners 1 into the pieces 2 via operation of the apparatus 300. The worker or operator may push a start button, which may be one of the operator controls 330. After performing checks, such as checking bypass switches and the emergency power off (EPO) button, a screw solenoid 140 may be engaged. Air escapement may advance a screw 1. The screw 1 may fall through the screw guide tube 210. The operator may turn on the drill or screwing device 230, and activate air cylinders of a pneumatic drive 240 powered by the compressor 350. The proximity sensor may be triggered, which may be performed via the visual indicator or laser 336, when the screw reaches a finished position. The drill 230 and air cylinders may stop. The air cylinder may return to a top position. When all of the air cylinders return to a top position, the operator or worker may reposition the apparatus 300 and push the start button to repeat the operation. FIG. 29A also illustrates the EPO process and the reset EPO process. When the EPO button is pushed by an operator, power to the PLC is stopped. When the EPO button is pulled by an operator, power to the PLC is started.

The disclosed method may include the step of drilling the received screw 1 into the workpiece 2. In an example, the workpiece 2 may include wood flooring 2. The wheels 312/313 of the cart 310 may facilitate the movement 315 of the cart 310 over the flooring 2. The input 365 for the operation of the apparatus 300 may be based on: the hardness 21 of the workpiece 2 (e.g., wood hardness 21 of the flooring 2), the length 116 of the screws 1, the threading type 117 of the screws 1, and/or the tensile strength 118 of the screws 1.

In some embodiments, the machine 360 may operate as a standalone device. In some embodiments, the machine 360 may be connected (e.g., using communications network, another network, or a combination thereof) to and assist with operations performed by other machines and systems, such as, but not limited to, the mobile and modular apparatus 300, its components (e.g. the computing device 360, the compressor 350, the drills 230, and/or any other components), any other system, program, and/or device, or any combination thereof. The machine 360 may be connected to any one or more components of the mobile and modular apparatus 300. In certain embodiments, the machine 360 may reside on, approximate or within the apparatus 300. In certain embodiments, the machine 360 may be external to the apparatus 300 or offsite. In further embodiments, a portion of the machine 360 may reside within the apparatus 300, and a portion of the machine 360 reside external to the apparatus 300. In a networked deployment, the machine 360 may operate in the capacity of a server or a client user machine in a server-client user network environment, or as a peer machine in a peer-to-peer (or distributed) network environment. The machine 360 may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions 370 to be taken by that machine 360. Further, while a single machine 360 is illustrated, the term "machine" shall also be taken to include any collection of machines 360 that individually or jointly execute a set (or multiple sets) of instructions to perform any one or more of the methodologies discussed herein.

The computer system 360 may include a processor 363 (e.g., a central processing unit (CPU), a graphics processing unit (GPU, or both), a main memory 361 and a static memory, which communicate with each other via a bus. The computer system 360 may further include a video display unit, which may be, but is not limited to, a liquid crystal display (LCD), a flat panel, a solid-state display, or a cathode ray tube (CRT). The computer system 360 may include an input device, such as, but not limited to, a keyboard, a cursor control device, such as, but not limited to, a mouse, a disk drive unit, a signal generation device, such as, but not limited to, a speaker or remote control, and a network interface device.

The processor 363 may comprise software, hardware, or a combination of software and hardware. In certain embodiments, the processor 363 may be configured to execute instructions from the main memory 361, the static memory, or a combination thereof, to perform the various operations of the mobile and modular apparatus 300. For example, the processor 363 may be utilized to activate or deactivate the cart 310, activate or deactivate the compressor 350, move the drills 230 on the cart 310 in various directions (such as towards a workpiece 2 to be drilled), cause the drills 230 to spin and drill into a workpiece 2, process data generated based on operation of the apparatus 300, process data received from external devices, control the apparatus 300, output visual and/or auditory information via an interface of the apparatus 300, receive and/or process inputs and/or outputs, perform any other operations, or a combination thereof. Notably, any number of processors 363, main memories, static memories and/or any of the other components of the computer system 360 may be incorporated and utilized. In certain embodiments, the computer system 360 may include a communications device, such as but not limited to, a transceiver, a communications module, a communications chip, any type of communications device, or a combination thereof. The communications device may enable the computer system 360 to communicate with the mobile and modular apparatus 300 and/or facilitate communications between the apparatus 300. Additionally, the communications device may enable the computer system 360 to communicate to other devices, which may or may not be communicatively linked to the mobile and modular apparatus 300. In certain embodiments, the communications device may enable the mobile and modular apparatus 300 to transmit data generated by the apparatus 300 to external devices and/or to receive data and/or commands (e.g. instructions for controlling the apparatus 300) from external devices.

The disk drive unit may include a machine-readable medium on which is stored one or more sets of instructions, such as, but not limited to, software embodying any one or more of the methodologies or functions described herein, including those methods illustrated above. The instructions may also reside, completely or at least partially, within the main memory 361, the static memory, or within the processor 363, or a combination thereof, during execution thereof by the computer system 360. The main memory 361 and the processor 363 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems 360. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor 363. Furthermore, software implementations can include, but not limited to, distributed processing or component/object distributed processing, parallel processing, or virtual machine processing can also be constructed to implement the methods described herein.

The present disclosure contemplates a machine-readable medium containing instructions so that a device connected to the communications network, another network, or a combination thereof, can send or receive voice, video or data, and communicate over the communications network, another network, or a combination thereof, using the instructions. The instructions may further be transmitted or received over the communications network, another network, or a combination thereof, via the network interface device. The communications network may be under the control of a service provider, an operator of the apparatus 300, any other designated user, a computer, another network, or a combination thereof. The communications network may be configured to link the apparatus 300 to each other and/or to external devices. For example, the communications network may be utilized by the cart 310 to connect with other devices within or outside communications network. Additionally, the communications network may be configured to transmit, generate, and receive any information and data traversing the components of the apparatus 300. In certain embodiments, the communications network may include any number of servers, databases, or other componentry. The communications network may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below. Although some of the drawings illustrate a number of operations/steps in a particular order, operations which are not order-dependent may be reordered and other operations may be combined or broken out. While some reordering or other groupings are specifically mentioned, others will be apparent to those of ordinary skill in the art and so do not present an exhaustive list of alternatives.

We claim:

1. A screw feeding device, comprising:
   a screw feeding tube;
   a screw rack for holding a plurality of screws; and
   a solenoid to release a single screw from the screw rack;
   a magnetic grip that moves a single screw from the screw rack to the screw feeding tube.

2. The screw feeding device of claim 1, wherein the screw feeding tube has a first opening dimensioned to receive the single screw,
   wherein the first opening comprises a screw slot along the longitudinal axis of the screw feeding tube.

3. The screw feeding device of claim 1, further comprising:
   a screw guide bracket to support and guide the single screw towards the magnetic grip; and
   an air piston to advance the single screw through the screw guide bracket.

4. The screw feeding device of claim 3, further comprising:
   a rotatable rod, wherein the magnetic grip is mounted on the rotatable rod; and
   a screw feeding motor coupled to the rotatable rod.

5. The screw feeding device of claim 4, wherein actuating the screw feeding motor rotates the rotatable rod until the single screw is passed through the first opening and dropped into the screw feeding tube.

6. The screw feeding device of claim 1, comprising:
   a magnetic grip that moves a single screw from the screw rack to the screw feeding tube.

7. The screw assembly of claim 6, further comprising:
   a screw guide tube having a side aperture connected to a second opening of the screw feeding tube of the screw feeding device, the second opening located near a bottom end of the screw feeding tube,
   wherein the lower portion of the screw guide tube comprises a plurality of bristles for centering the received screw within the screw guide tube, each bristle of the plurality of bristles projecting from an interior surface of the screw guide tube inwardly towards the center of the screw guide tube, the plurality of bristles providing support to hold the received screw while the screwing device drives the received screw through the hole at the proximal end of the screw guide tube.

8. An apparatus, comprising:
   a cart with wheels;
   an assembly rail system mounted to the cart; and
   a screw assembly, the screw assembly comprising:
      a screw feeding device, the screw feeding device comprising:
         a screw feeding tube;
         a screw rack for holding a plurality of screws; and,
         a solenoid to release a single screw from the screw rack.

9. The apparatus of claim 8, wherein the assembly rail system is dimensioned to support a plurality of screw assemblies, each one of the screw assemblies comprising the screw assembly, the screw assemblies configured to be removably and slidably mounted to the assembly rail system, whereby a predetermined distance between each one of the screw assemblies is adjustable, and whereby the apparatus drills a set of screws into the workpiece.

10. The apparatus of claim 8, wherein the wheels are motorized.

11. The apparatus of claim 8, wherein the screw assembly further comprises a pneumatic drive that provides a force to drill the received screw into the workpiece.

12. The apparatus of claim 11, furthering comprising:
a compressor that enables the force to move the pneumatic drive, wherein the compressor further enables an opposite force to return the draft shaft to a rest position.

13. The apparatus of claim 11, wherein the screw assembly further comprises a plurality of limit stops, wherein a limit stop of plurality of limit stops disengages the screwing device or the pneumatic drive.

14. The apparatus of claim 11, further comprising:
a computer control system that operates the screwing device, the screw feeding device, the pneumatic drive or a combination thereof.

15. The apparatus of claim 14, wherein the computer control system comprises:
a memory that stores instructions; and
a processor that executes the stored instructions to perform operations, the operations comprising:
activating the screw feeding device to feed the single screw to the screw guide tube.

16. The apparatus of claim 15, wherein the operation further comprise activating the screwing device to rotate the drive shaft.

17. The apparatus of claim 15, wherein the operation further comprise activating the pneumatic drive to drill the received screw into the workpiece based on a distance from a prior screw insertion.

18. The apparatus of claim 15, wherein the operations are based on user input via an operator control.

19. The apparatus of claim 8, further comprising a visual indicator.

20. The apparatus of claim 8, further comprising a foot pedal.

* * * * *